US007247285B2

(12) United States Patent
Zauderer

(10) Patent No.: US 7,247,285 B2
(45) Date of Patent: Jul. 24, 2007

(54) REDUCTION OF SULFUR, NITROGEN OXIDES AND VOLATILE TRACE METALS FROM COMBUSTION IN FURNACES AND BOILERS

(76) Inventor: Bert Zauderer, 275 N. Highland Ave., Merion Station, PA (US) 19066

( * ) Notice: Subject to any disclaimer, the term of this patent is extended or adjusted under 35 U.S.C. 154(b) by 696 days.

(21) Appl. No.: 10/724,255

(22) Filed: Dec. 1, 2003

(65) Prior Publication Data
US 2004/0120874 A1 Jun. 24, 2004

Related U.S. Application Data

(60) Provisional application No. 60/430,090, filed on Dec. 2, 2002.

(51) Int. Cl.
*B01D 53/34* (2006.01)
(52) U.S. Cl. .................. 423/210; 423/235; 423/242.1; 423/244.07; 423/244.08; 423/245.1
(58) Field of Classification Search ................ 423/210, 423/235, 242.1, 244.07, 244.08, 245.1
See application file for complete search history.

(56) References Cited

U.S. PATENT DOCUMENTS

| | | | |
|---|---|---|---|
| 4,624,191 A | 11/1986 | Zauderer | |
| 4,765,258 A | 8/1988 | Zauderer | |
| 4,922,840 A | 5/1990 | Woodroffe et al. | |
| 6,048,510 A | 4/2000 | Zauderer | |
| 6,352,956 B1 * | 3/2002 | Kienow et al. | 502/417 |
| 6,453,830 B1 | 9/2002 | Zauderer | |
| 7,022,296 B1 * | 4/2006 | Khang et al. | 423/210 |
| 2002/0061270 A1 * | 5/2002 | Osborne | 423/210 |
| 2002/0061271 A1 | 5/2002 | Zauderer | |

OTHER PUBLICATIONS

"Mercury Study Report to Congress", vol. II, EPA-425/R-97-004, Dec. 1997.

"Study of Hazardous Air Pollutant Emissions from Electric Utility Steam Generating Units—Final Report to Congress", vol. II, EPA-453/R-98-004b, Feb. 1998.
B. Zauderer, "Use of an Air Cooled Cyclone Coal Combustor to Convert Ash to Inert Slag", DOE SBIR-DE-AC01-88ER80568, Phase 1 Final Report, Mar. 13, 1989.
B. Zauderer, "Status of Coal Tech's Air Cooled Slagging Combustor", in 2nd Annual Clean Coal Technology Conference Atlanta, GA, Sep. 8, 1993, vol. 1, pp. 467-482.
B. Zauderer, "Small, Modular, Low cost Coal Fired Power Plants for the International Market", in 7th Clean Coal Technology Conference, Tampa, FL, Jan. 1997.
L. Bonfanti, "PCDD/Formation and Destruction from Co-Firing and RDF in a Slagging Combustor", ENEL-Nuclear Research Center, Pisa, Italy, Jul. 1992. Also in a paper presented at an International Environmental Conference, Lisbon, Portugal, 1992.
B. Zauderer, "Control of Dioxin Emissions from Waste Fuel Combustion by Cofiring with Coal", DOE-SBIR Phase 1 Project Final Report, Contract No: DE-FG05-93ER81554, Mar. 24, 1994.
V. Boscak, et al., "Techniques for Dioxin Emission Control", in Proceedings of Municipal Waste Combustion Conference, Tampa, FL, Apr. 15, 1991, Sponsored by EPA & Air & Waste Management Association, pp. 383-397.
B. Brown, et al., "Control of Mercury and Dioxin Emissions from U.S. and European MSW Incinerators by Spray Dryer Absorption," Municipal Waste Combustion Conference, Apr. 15, 1991, pp. 675-705.
M. Clarke, "A Review of Activated Carbon Technologies for Reducing MSW Incinerator Emissions" in Municipal Waste Combustion Waste Combustion Conference, Tampa, FL, Apr. 1991, pp. 975-994.

* cited by examiner

*Primary Examiner*—Timothy C. Vanoy
(74) *Attorney, Agent, or Firm*—Greenblum & Bernstein, P.L.C.

(57) ABSTRACT

A method for reducing the cost of emission control by utilizing a combination of low cost, combustion and post-combustion processes to eliminate emissions of sulfur and nitrogen oxides, and trace metals, including mercury, and trace dioxins and furans. These processes are applied sequentially to the combustion flow train of an air-cooled, slagging combustor-boiler, and include two groups of process steps. One group is implemented in the combustor and the other in post combustion zones.

33 Claims, 5 Drawing Sheets

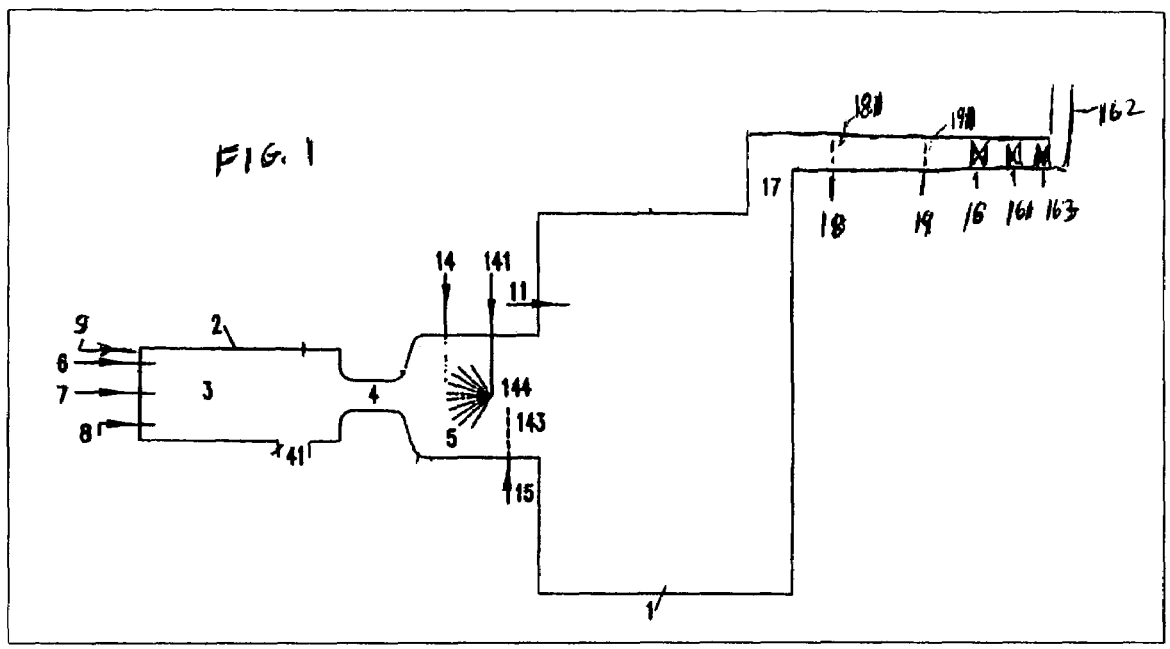

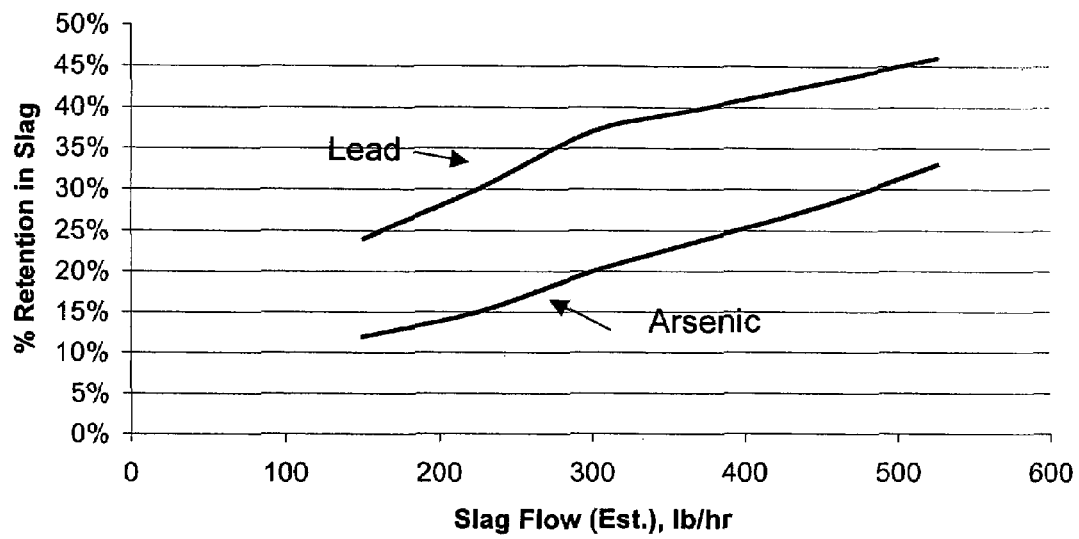
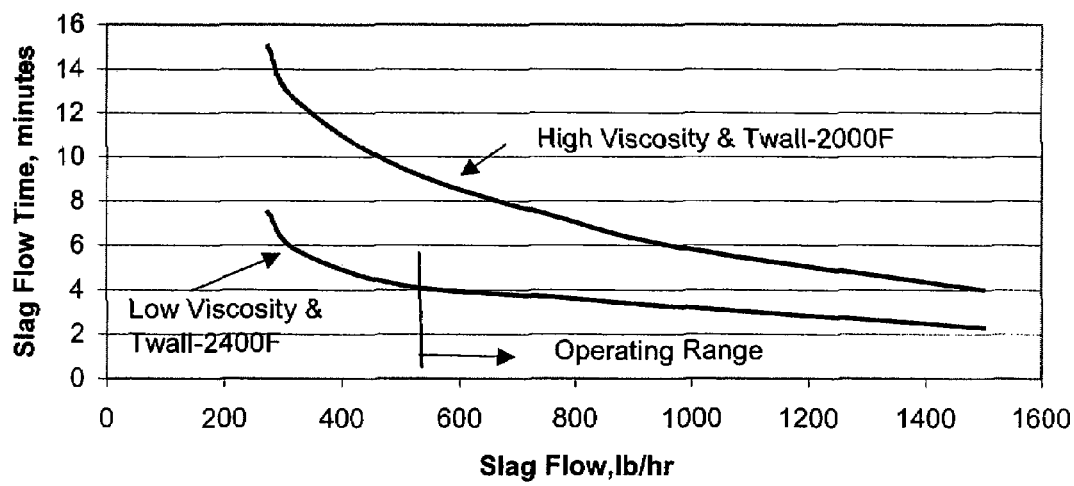

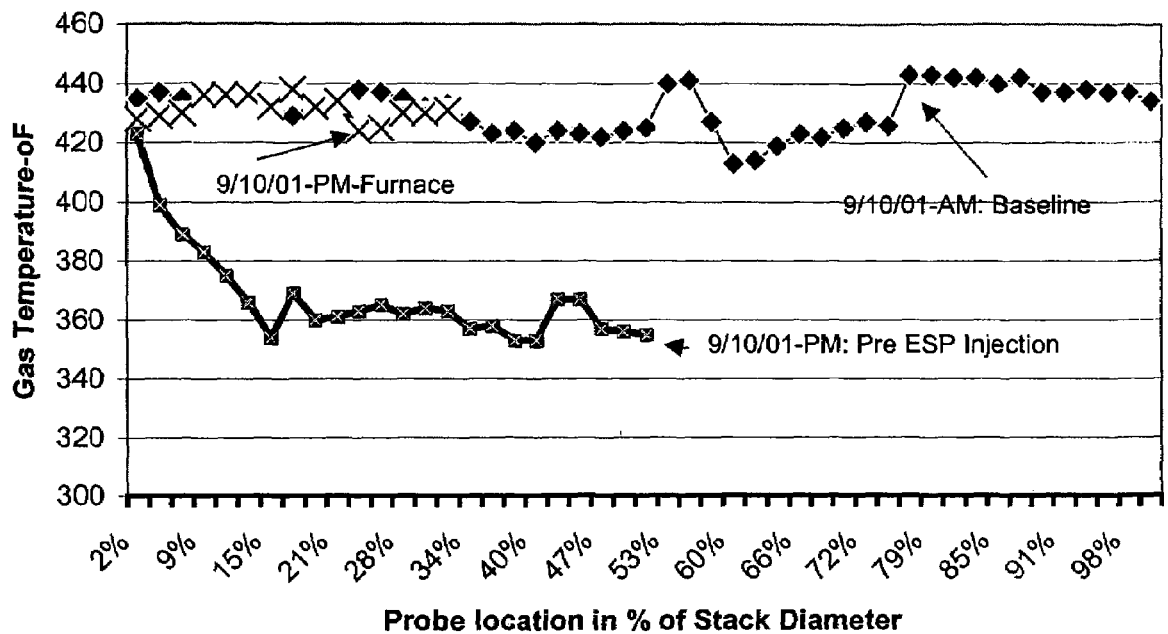
Figure 4: Stack Gas Temperature Traverse-9/10/2001 Tests
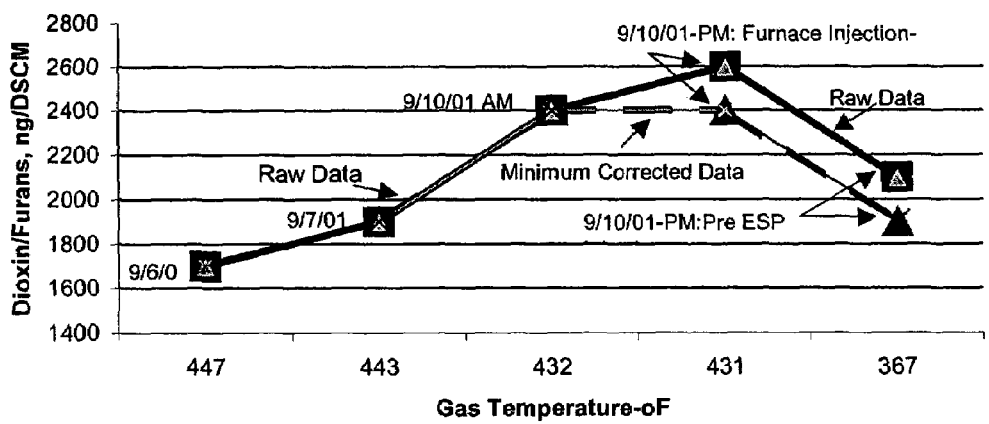
Figure 5: Total Dioxin/Furans vs Gas Temperature-9/01 Tests

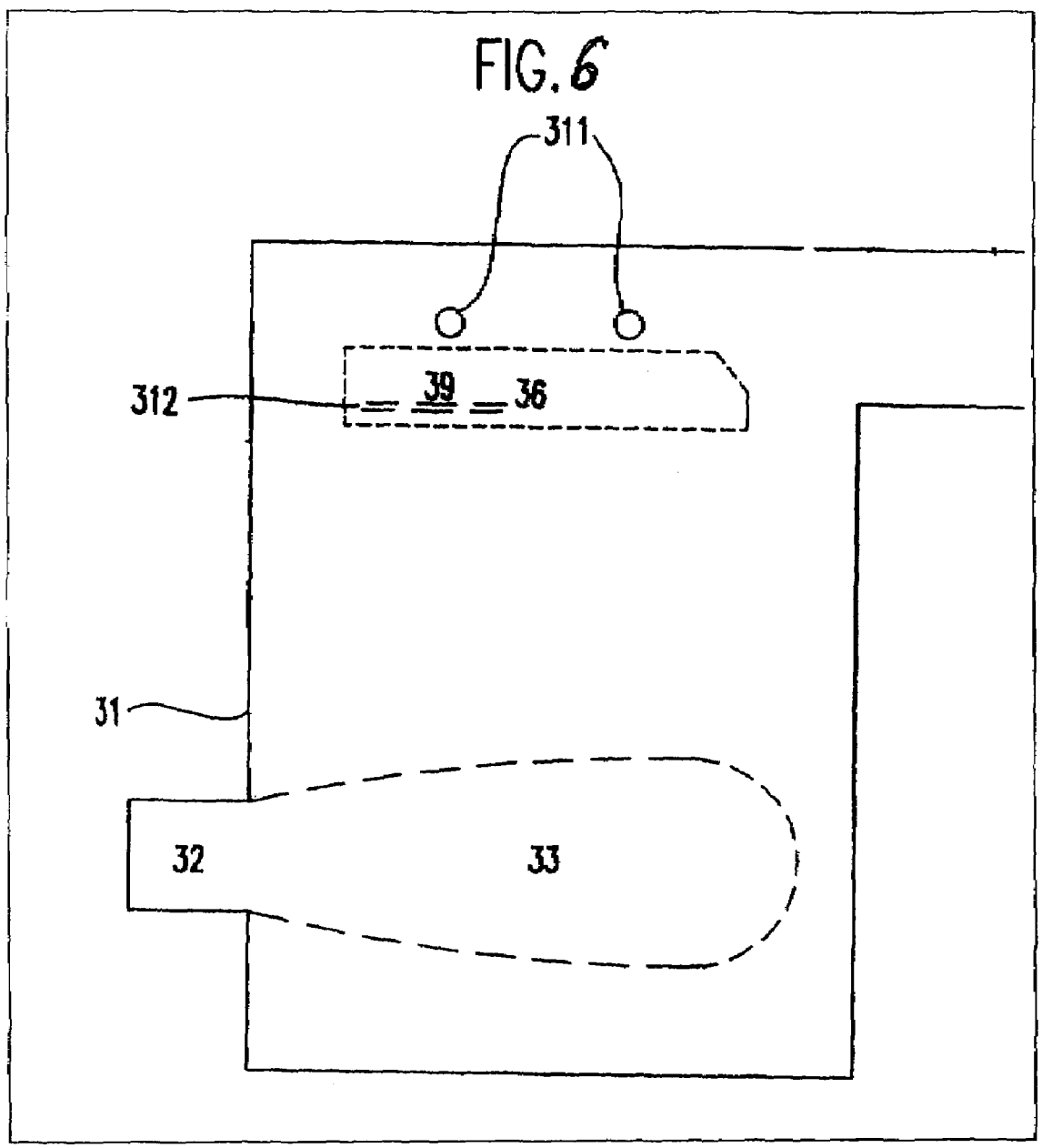

US 7,247,285 B2

REDUCTION OF SULFUR, NITROGEN OXIDES AND VOLATILE TRACE METALS FROM COMBUSTION IN FURNACES AND BOILERS

REFERENCE TO CROSS RELATED APPLICATIONS

This application claims priority to U.S. Provisional Application Ser. No. 60/430,090, filed on Dec. 2, 2002, all of which are incorporated in its entirety by reference.

BACKGROUND OF THE INVENTION

1. Field of the Invention

The invention relates to reduction of sulfur and nitrogen oxides and volatile trace metals from coal and solid fuel combustion in furnaces and boilers and a method of use.

2. Description of Related Art

Due to increasingly stringent and very costly emission regulations in recent decades, coal utilization has remained essentially constant in the U.S., despite its abundance and stable pricing. Historically, the primary concern has been emissions to the atmosphere of sulfur dioxide ($SO_2$), nitrogen oxides ($NO_x$), and ash particulates. In the past several years, the allowable emissions from these three pollutants have been further reduced. In addition, new requirements have been proposed, especially the emission of mercury, which is found in coal in minute quantities in the range of 20 to 100 parts per billion (ppb).

Many technologies have been developed and are available for commercial use to control each of these pollutants to the most stringent levels now being proposed by the U.S. Environmental Protection Agency (EPA). However, the common feature of these technologies is high, to extremely high, capital and/or operating costs. Historically, the favored approach has been to integrate the control processes for $SO_2$, $NO_x$, and particulates in the exhaust ducting of the boilers. This approach was also extended to adding controls for mercury and dioxin/furans to this same exhaust duct region. However, this has proven to be very costly because certain reactions are slow at these low temperatures, thereby necessitating large components. Also, it is known that some processes interfere with others, thereby necessitating further complexity in the process design. For example, mercury and dioxin/furan reduction improves as the temperature of the gases decreases below the acid dew point of $SO_2$ and HCl. However, these acids corrode metal walls.

The overall result of applying current control methods to meet new regulations for coal fired power plants, which will require $NO_x$ reductions to 0.15 lb/MMBtu, 90% mercury removal, while maintaining existing $SO_2$ reductions, has been estimated by EPA and the U.S. Department of Energy (DOE) to cost about $10 per megawatt-hour (MWH). This equals to 40% of the historical average, wholesale price of electricity of $25/MWH. To this cost must be added the probable future cost for reducing greenhouse gas emission, primarily carbon dioxide, $CO_2$, which is produced in greater quantity from coal combustion than oil or natural gas.

In consequence of these high costs for pollution control, there has been in recent decades an almost total shift toward the use of natural gas for new electric power plants. However, natural gas is far less abundant than coal, and it also serves large existing markets, such as domestic and commercial heating. The problem with relying on natural gas as a power plant fuel was demonstrated in the economic recession of 2001 when the wholesale price of electricity decreased to its low historical level in the $25/MWH range, while the price of natural gas, with its multiple uses, remained relatively high. As a result, operators of natural gas fired-power plants were faced with declining revenues and high fuel prices. The economics of municipal waste incineration for waste disposal and energy recovery were also adversely affected by costly environmental regulations with the result that waste is now preferably disposed in landfills, with the result of future pollution from methane gas emissions from said sites.

As mentioned, known art has focused on treating the pollutants primarily in the exhaust ducting of boilers and furnaces. While the goal was to achieve an integrated approach, the reality has been that major pollutants have been treated with separate processes. While this approach will generally meet the most stringent current and proposed regulations, their implementation does not lead to any economic benefit from integration. For example, Selective Catalytic Reduction (SCR) will, in one step, reduce $NO_x$ to meet the most stringent regulations. However, it is extremely costly, and it offers no benefit to the control of $SO_2$, or mercury. The result has been, as noted above, that EPA and DOE estimate meeting current and proposed emission regulations for $NO_x$, $SO_2$, and mercury will cost $10/MWH, which equals to 40% of the historical wholesale price of electricity of about $25/MWH.

Some of the volatile metals released during combustion, such as mercury and arsenic, can pass through fabric filters or ESP's (ElectroStatic Precipitators) into the atmosphere. The EPA has proposed using Best Available Control Technology (BACT) to remove the mercury emitted from U.S. coal burning plants. According to EPA's Reports to Congress ("Mercury Study Report to Congress, Vol. VIII (EPA-452/R-97-01010), December 1997 and "Air Pollutants from Electric Utilities-Report to Congress", (453/R-98-004a), February 1998 (hereinafter referred to as "EPA")), coal burning plants emit to the atmosphere about 33% of the mercury (Hg) emitted in the U.S. The DOE's current estimate is that removing 90%, or 37 tons of Hg, would cost about $5 billion, or $70,000/lb of Hg removed, or add $5/ton to the cost of U.S.'s coal production. Municipal solid waste (MSW) combustion systems account for 19%, or 27 tons of Hg emissions in the U.S. However, due to their higher concentration and different combustion process the cost of Hg removal is only, according to EPA, $11 to $47 million, or $211 to $870/lb of Hg.

It is critical to sharply reduce the cost of Hg removal from coal-fired power plants in the U.S. because the EPA reports (loc. cit.) state that Hg emission is a global atmospheric problem. Of the 5,000 to 5,500 tons emitted per year, 1000 tons are from natural sources, 2000 tons are re-emitted from prior years, and 2,000 tons are new emissions. Of this total, the U.S. emits only 3% (120 ton) and the U.S. coal fired power plants emit 1% (about 41 ton). By coincidence, 35 tons, which almost equals the total U.S. coal plant emissions, deposit in the U.S. from worldwide Hg emissions. Therefore, the U.S. would benefit directly by reducing global Hg emissions in Asia, whose power plants and other furnaces use the very high (up to 40%) ash coals.

The currently favored mercury emission process for coal fired power plants and MSW plants is injection of activated carbon with various spray injectors into the combustion gases flowing through the ducts upstream of the ash particle removal equipment (EPA, loc. cit.). One problem with this method is that injection must take place at gas temperature above the dew point for acid condensation from sulfur and nitrogen compounds and HCl in the gas, typically above 350° F. At these higher temperatures the mercury reduction effectiveness and also of dioxin/furans by activated carbon is greatly reduced. As the gas temperature is lowered the capture of Hg by activated carbon improves dramatically, with almost total removal measured at gas temperatures of about 220° F. It is, therefore, necessary to remove all the acid producing species, primarily sulfur and nitrogen oxides and chlorine, prior to cool down of the combustion gases to the temperatures below the acid dew points. In fact, as will be discussed below, it appears that the primary benefit in the prior art of injecting lime in large and complex spray dryers systems to reduce dioxin/furan emissions and improve mercury removal is to eliminate the corrosion from acid condensation at the low temperatures at which dioxin/furan emission reduction is effective.

In addition, the presence of other trace species that are in much higher concentrations in the gas stream, including $SO_2$ and volatile trace metals, can attach to the porous activated carbon particle surface and prevent the gettering of the Hg. This is a critical deficiency in the use of activated carbon injection because the infinitesimal mercury concentration competes with far more numerous other species that can attach to the carbon. Sharply reducing these other species in the activated carbon injection zone is thus required.

A consequence of the above noted deficiencies for high Hg reductions are the need for extremely high carbon to Hg ratios. This results in replacing one environmental air emission problem with a future water and solid emission problem because mercury contaminated carbon must either be recycled or properly landfilled. To address this issue, EPA is turning to "life cycle assessment" or "cradle to grave" emission control to assure that removal of a pollutant from air, for example, does not create a water or solid waste problem.

To quantify this problem, one solution to mercury removal is coal washing at the mine that can remove up to 60% of the Hg with advanced deep cleaning processes [EPA, loc. cit.]. However, the Hg is deposited in large slurry ponds near the coalmines, and it may leach out to the water supply in the future. Similarly, the Hg removed in stack equipment of coal-fired power plants with the currently favored activated carbon injection processes require anywhere from 100's to 34,000 more carbon than Hg, (according to EPA), or 100,000 times more carbon, according to the DOE (EPA loc. cit.). This would replace 37 tons of Hg removed from the stack gases with 1 to 3+ million tons of mercury containing, solid waste. EPA (loc. cit.) estimates that this could increase electricity costs by around $2/MWh, while DOE estimates around $5/MWh, which equals 8% to 20% of the current wholesale electricity price of $25/MWh. EPA's (EPA, loc. cit) review of the many processes that remove mercury from stack gases all rely on some form of capture by specially prepared carbon, ranging in cost from activated carbon costing about $1,000/ton to proprietary compounds that cost 20 times as much.

Even if these mercury control technologies are adopted in the U.S., other volatile trace metals, such as lead or arsenic, or even minute traces of radioactive trace elements in coal ash, must also be removed from atmospheric emission. Furthermore, the deposition of these materials on U.S. soil from coal combustion overseas must be addressed because mercury from overseas deposits on U.S. soil and in the Pacific Ocean fisheries, whose fresh fish are eaten in Pacific Coast States. There is a greater than anticipated health risk from mercury as just reported in a study of 116 persons (Jane M. Hightower, "Study of Mercury in People's Blood", Journal of Environmental Health Perspectives, Nov. 1, 2002) that ate more that 2 servings per week of fish, 89% had mercury levels above the 5 ppm recommended by the National Academy of Sciences.

Trace Metal Removal in the Air-Cooled, Cyclone Coal Combustor

Vitrification converts the fly ash that contains leachable toxic metals, such as arsenic and lead, into a chemically inert glassy material that can be used beneficially, (B. Zauderer & E. Fleming, "Air Cooled Cyclone Coal Combustor to Convert Ash to Inert Slag", DOE SBIR-DE-AC01-88ER80568, Phase 1 Final Report, Mar. 13, 1989; Phase 2 Final Report: Jul. 13, 1992) and (2. B. Zauderer & E. Fleming, "A Cyclone Coal Combustor to Convert Municipal Incinerator Ash to Inert Slag", Final Report EPA-SBIR Contract 68D90117, Apr. 30, 1991.). A key element of fly ash vitrification process was to prevent the re-evolution of volatile trace metals in the fly ash into the combustion gases in the air-cooled combustor. These trace metals were in two forms: one was trace metals that had remained trapped and dispersed throughout the ash particles during the original coal particle combustion in the power plant, and the other consisted of volatile metals that had condensed onto surfaces and internal pores structure of the fly ash particles in the stack gas stream and on the ash captured on the surfaces of the baghouse or ESP.

A "kinetic vitrification" process is based on the concept that the simplest and lowest cost method of limiting volatile metal emission to the atmosphere is to prevent them from evolving from the ash particles during combustion. As ash particles melt during combustion the volatile metals diffuse to the ash surface and vaporize. Therefore, to retain most of the volatile metals inside the ash particle or droplet it is essential to limit its residence time in the hot combustion gas. This is accomplished by the centrifugal force from the swirling combustion air that forces ash droplets to the liquid slag covered combustor wall. Since the volatile metals can still diffuse back to the liquid slag surface on the wall and re-evolve into the combustion gases, the slag must be rapidly drained into a water-cooled quench tank. Theoretical analysis (Zauderer & Fleming, loc. cit.) of the diffusion process in ash droplets and the slag layer show that this is feasible in a cyclone combustor whose refractory liner is air-cooled with the liners' solid surface in contact with the slag at the slag melting temperature.

As described in Zauderer & Fleming (loc. cit.), the time dependent diffusion equation for the time of evolution of a volatile metal from a spherical liquid slag droplet in the known range of particle size distribution is solved to determine the radial concentration of a trace metal. It is assumed that the concentration of the species, such as Hg, is uniformly dispersed in the sphere. The total loss of metal, e.g. Hg, is computed for the time of flight between fly ash particle injection to impact of the ash particle or droplet on the liquid slag covered combustor wall. The next step in the analysis is to solve the same diffusion equation for the liquid slag layer on the combustor wall. The solution provides the trace metal evolution from the slag layer. Here the total time is the slag layer drainage time, which is computed from the integrated, time dependent solution for viscous Stokes flow on the combustor wall. Air-cooling allows variation of the liner surface temperature as the slag melting temperature varies with different coal ashes. Additional variability in slag layer residence time is obtained by injection of calcium oxide based particles with the coal, which changes the slag viscosity.

The testing of this kinetic vitrification process was implemented in DOE and EPA projects (Zauderer and Fleming, loc. cit.) in which fly ash from a coal power plant and from a municipal incinerator were vitrified in Coal Tech's 20 MMBtu/hr, air-cooled combustor (Zauderer, U.S. Pat. No. 4,624,191, Nov. 25, 1986). As shown schematically in FIG. 1, the injected air from a pressure blower provides a swirling flow whose centrifugal force drives particles and droplets into the liquid slag layer that lines the inner combustor wall. Firing coal that is pulverized to 80% (by weight) passing a 200 mesh, results in about 75% of the ash that remains solid or is liquefied in the combustion gas being driven into the slag layer in the wall. The slag is drained through a slag tap at the downstream end of the combustor's floor, (FIG. 1). Ash particles as small as 10 microns impacted the slag layer within the 4-foot axial length of the combustor wall, with said particle or droplet transit time equal to or somewhat less than the combustion gas transit time of 80-millisecond in that combustor. Larger particles impact the wall sooner. For example, a 20-micron particle impacts the slag layer within 20 milliseconds, while a 50-micron particles impacts within 10 milliseconds.

Particles smaller than 10 microns will escape even from an air-cooled combustor twice as long, namely 8 feet, as was verified with such a combustor that has been in operation at Coal Tech Corp's facility in Philadelphia, Pa. since 1995. Therefore, retention of volatile trace metals in the fly ash tests cited above, whose mean particle size was somewhat under about 10 microns, was more difficult to achieve than with larger ash particles, except at very high swirl. Nevertheless, significant concentrations of volatile arsenic and lead were retained in the slag in the 20 MMBtu/hr-combustor (See FIG. 2). This was accomplished by operating the inlet swirl air pressure at 40 inches water gage (w. g.) where 90% of the ash was retained in the slag layer in the 4-foot long, combustor wall.

The theoretical analysis requires knowledge of diffusion data for these elements in the slag. For this purpose experimental data on the diffusion of sulfur and oxygen atoms in liquid metal oxide slag was used. It was determined that almost all the volatile metals could be retained in liquid ash droplets as small as 20 microns during the 20 millisecond interval between injection and slag layer impact. Even 10 micron-particles, which equaled the mean size of the fly ash used in the tests, retained (according to the analysis) 44% of volatile atoms in the 80 milliseconds interval from coal particle injection to slag layer impact.

The second critical step in kinetic vitrification is to prevent the re-evolution of the volatile metals captured in the slag layer during the time a liquid ash droplet or ash particle impacts the slag layer to its removal through the slag tap into the water filled quench tank. A slag element's residence time in the 20 MMBtu/hour air-cooled combustor's slag layer ranges from a few minutes to almost 30 minutes, depending on the slag layer thickness, slag layer temperatures, viscosity and slag mass flow rates. Again, using the $O_2$ or S diffusion coefficients in liquid metal oxides as representative of volatile metals, e.g., As or Pb, but this time in a planar slab layer with a slag layer thickness of 2 millimeters and a surface temperature of 2300° F., it was computed that almost all volatile metals would remain in the slag if the slag residence time on the combustor wall was about 3 minutes, or less.

The above discussion of controlling the emissions of volatile trace metals, including mercury, focused on preventing their evolution from the ash particles and liquid ash droplets during their time of flight from injection inside the coal particles to their release during combustion and impact and dispersal in the slag layer on the combustor wall.

Sulfur Capture With Limestone or Lime Injection into a Slagging Cyclone Combustor Several groups conducting research on different designs of slagging combustors in the late 1970's to early 1980's discovered independently that the injection of limestone into a slagging coal combustor would reduce the $SO_2$ emissions. One group conducted tests in a 1 MMBtu/hr air cooled combustor (C. S. Cook, et. al, "Evaluation of Closed Cycle MHD Power", Final Report, U.S. DOE Contract Mo: DE-AC01-78ET10818, November 1981) and (B. Zauderer, "Sulfur Capture with Limestone Injection in Cyclone Combustion Flows", National Science Foundation Final Report, Grant No: CPE-8260265, Apr. 15, 1983, Hereafter "Zauderer-NSF") in which 25% to 30% $SO_2$ reduction was measured at the stack with limestone injection at a high Ca/S mol ratio of 9 to 1. The combustion gas residence time was about 50 m.sec. Another group (J. Stamsel, et. al., "TRW's Slagging Combustor System Tests" in 6th International Coal Utilization Conference, Houston, Tex. November 1983) also reported 10 to 45% capture with Ca/S mol ratios of 1 to 6.

These results were puzzling because the gas temperatures in slagging combustors is about 3000° F., while the reaction of calcined limestone, CaO, with $SO_2$ to form $CaSO_4$, reverses above about 2200° F. Furthermore, above this temperature melting of the particle's surface blocks access of $SO_2$ gas molecule to the internal pore structure of the calcined particles, where almost the entire CaO—$SO_2$ reaction occurs. Also, the published data for this "pore structure" reaction of CaO with $SO_2$ in the temperature below 2200° F. showed that the reaction times needed for $SO_2$ capture by CaO were in the range of 1 second, while the typical gas transit times in slagging combustors was generally under 100 m.sec. (Zauderer NSF, loc. cit.).

Zauderer suggested one possible explanation (Zauderer, NSF and Zauderer, "Analytical Investigation of Sulfur Capture and Slag rejection in Cyclone Coal Combustors", Final Report, U.S. DOE Contract No. DE-AC22-82PC50050, Jan. 17, 1983) for the rapid sulfur capture, namely, that it occurred primarily near the injection zone of the coal, limestone, and air into the combustor. Rapid volatilization of the coal particles releases the organic matter in the coal, including the sulfur, resulting in ignition and heatup under locally high excess air conditions. Consequently, the local gas temperature is lower than the final gas temperature of about 3000° F. However, the temperatures are high enough to rapidly heatup and calcine the limestone or lime, resulting in an internal porosity that is substantially greater than the values reported in the literature with slow calcinations. Furthermore, the heatup rates of the CaO particles lag that of the combustion gases, and it is the surface temperature of the CaO particles that control the reaction with $SO_2$. Therefore, the combination of a cooler initial combustion zone, a slower CaO heatup rate compared to the gas, and the greater particle porosity, all result in substantially greater sulfur capture than would be predicted by slower reactions under equilibrium gas and particle temperatures, as would exist in large boilers.

Since the smaller $CaSO_4$ particles remain entrained for greater axial distances in the combustor they enter the final gas temperature region where the sulfur capture reaction should begin to reverse. This effect is reduced by the swirl of the gases that drives the particles into the slag layer where they melt and trap the sulfur. However, this latter effect is counterbalanced by the low solubility of sulfur in slag. It is, therefore, essential to remove the slag within several minutes.

The analysis of the time intervals for these gas phase and liquid slag phenomena were discussed above in connection with the vitrification of the volatile trace metals in coal ash. In fact, the capture of volatile trace metals by injected particles into the combustor would be governed by the same phenomena. The particles in the 10 to 100 microns size range remain entrained in the combustion gas from several milliseconds to 100 milliseconds, and that particles under 10 microns will be carried out of the combustor through the exit nozzle, and that the slag layer residence time in the combustor must be within a few minutes to prevent volatile gas re-evolution. This entire process for sulfur capture is described in Zauderer, ("Method of Optimizing Combustion and the Capture of Pollutants During Coal Combustion in a Cyclone Combustor", U.S. Pat. No. 4,765,258.)

J. A. Woodroffe and J. S. Abichandani ("Sulfur Equilibrium Desulfurization of Sulfur Containing Products of Combustion", U.S. Pat. No. 4,922,840, May 8, 1990) describe a sulfur capture process similar to Zauderer (U.S. Pat. No. 4,765,258), which they define as a "super equilibrium" process. Their application is to a toroidal, slagging combustor in which the coal, limestone, and air are all injected tangentially along the outer diameter of a "pancake" shaped combustor. The gases and slag are removed through an opening at the central bottom of the combustor. They teach the use of small particles of a mean size of 325 mesh and greater than 10 microns, and a 25 to 35 millisecond residence time in the combustion chamber. The two major deficiencies in their approach is that the toroidal combustor results in immediate injection into the nominal 3000° F. gases which greatly reduces the available time during which the CaO particles are in the colder temperature range where $SO_2$ capture is favored. Furthermore, they fail to note the need for rapid slag removal to prevent sulfur re-evolution from the slag.

It has been difficult to achieve repetitive results and to optimize the sulfur capture process in the slagging combustor due to the competing reactions all of which occur within the combustor. For example, Zauderer reported (B. Zauderer, et. al., "Status of Coal Tech's Air Cooled Slagging Combustor", in $2^{nd}$ Annual Clean Coal Technology Conference, Atlanta, Ga., Sep. 8, 1993, Vol. 1, pp. 467-482) 70% $SO_2$ reduction measured at the stack in tests in the 20 MMBtu/hour, air-cooled combustor with limestone injection at a Ca/S mol ratio of 4. However, a sampling probe at the combustor exit revealed that only 19% of this reduction occurred inside the combustor, with the balance occurring in the cooler, 2000° F. and lower, post-combustion zone downstream of the exit. This result suggested that despite transit through the 3000° F. gas temperature, the calcined CaO particles retained their pore structure, which is necessary for substantial $SO_2$ capture, without "dead burning", i.e. melting of the CaO particle surface. However, 80% $SO_2$ reduction was measured during the same test series by injecting more reactive lime into the immediate post-combustion zone (nominal 2000° F. gas temperature) in the boiler, (See FIG. 1). The mean particle size of lime is about 10 microns, compared to about 74 microns for the limestone injected into the combustor. This lower temperature and smaller particle sizes account for the about 33% greater effectiveness of lime than limestone in sulfur capture in the combustor.

These tests were repeated (B. Zauderer, et. al, "Small, Modular, Low Cost Coal Fired Power Plants for the International Market", in $7^{th}$ Clean Coal Technology Conference, Tampa, Fla., January 1997) in a second-generation design of the 20 MMBtu/hour air-cooled combustor whose internal diameter was also 2.5 ft., but whose axial length was doubled to 8 feet, which resulted in a longer gas residence time. This resulted in major improvements in slag retention in the combustor in that all the slag was drained through the slag tap, as opposed to substantial slag flow out of the exit nozzle into the boiler. Slag flow out of the exit nozzle into the boiler has a much longer residence time at high temperature, which allows all the sulfur in the slag to re-evolve into the gas phase. In this longer combustor, with essentially no slag flow out of the combustor into the boiler, sulfur capture was higher, averaging 60% to 75% at Ca/S mol ratios of less than 3. Also, sulfur retention in the slag improved with values in the 10% to 20% range, which was measured in a high, 37% Indian ash coal. There the slag flow rates were in the 300 to 400 lb/hr range. However, this sulfur concentration in the slag did not represent a major fraction of the sulfur removed in the combustor by lime or limestone injection because the analysis of sulfur re-evolution from hot slag required slag mass flow rates above 500 lb/hr in order to limit the slag residence times in the combustor to 3 minutes.

In summary, a general observation from the prior art on sulfur capture in slagging combustors is that the published results do not teach how the process should be applied to large commercial scale (20 MMBtu/hour or greater) slagging combustors. The data shows a wide range of $SO_2$ reduction with no clear correlation on how the process would scaleup or how to optimize it. High $SO_2$ reductions have been reported; however, the relationship of these reductions to the removal of the reacted sorbent has been overlooked except in the prior work of Zauderer, who reported results of captured sulfur reporting to the slag. Also, Zauderer reported that in some cases, a significant part of the sulfur capture occurred in the immediate post-combustion zone with no evidence that transit of larger calcined limestone particles through the 3000° F. gas temperature in the combustor caused substantial "dead burning" of the particles, which would limit their sulfur capture effectiveness. Zauderer also attempted to isolate the capture and retention parts of the process by injecting gypsum as a sulfur gas generator in order to study the relationship of high slag mass flow rates on sulfur capture. Zauderer also used fly ash and more recently, high (70%) ash rice husk gasifier waste for this purpose. However, while a trend was established between increased slag flow and increased sulfur retention in slag, the total capture of 20% of the injected sulfur in the slag was still low.

Separately, in connection with using the air-cooled slagging combustor for mercury removal, EPA reported (EPA, loc. cit.) that the high ash residue in advanced coal-washing plants remove up to 60% of the mercury in the raw coal. It is almost certain that this mercury is in the inorganic ash, where retention of volatile trace metals within the ash particles released during coal particle combustion phase was found by Zauderer to be effective.

Injection of Activated Carbon for Mercury Reduction in the Combustion Gas Stream of the Boiler or Furnace Exhaust Ducting As shown by analysis and tests (B. Zauderer & E. Fleming, DOE Contract: DE-AC01-88ER80568, loc. cit.) even at very high swirl in the air-cooled cyclone combustor, 10% of the ash mass, consisting of particles less than 10 microns, will exit the combustor. Also some fraction of the mercury in the organic part of coal will escape the combustor. It is therefore, necessary to add an additional process, such as the injection of various types of getters, either activated carbon or calcined lime, upstream of the particulate capture devices. Prior art (EPA, loc. cit) has shown that depending on factors, such as coal and ash type, reagent type, etc., most of the mercury can be removed from the gas stream. However, current injector schemes even with activated carbon that is enhanced with sulfur or iodine will in most cases require extremely high (up to 100,000 to 1) carbon to initial mercury mol ratios (EPA, loc. cit.).

Removal of $SO_2$ and $NO_x$ from the Post Combustion Gas Stream

As noted above, Zauderer has developed and tested (B. Zauderer, "Method of Reducing $NO_x$ in Combustion Effluents" U.S. Pat. No. 6,048,510) a variable droplet size injection method that disperses droplets of a reagent of ammonia or urea dissolved in water throughout gas volumes ranging from the 20 MMBtu/hr boiler to 100 MWe power plant boilers. Since vaporization proceeds from the droplet surface inward, larger droplets penetrate deeper into the gas. Specialists in the field call this process Selective Non-Catalytic Reduction (SNCR). In 1997, coal-fired tests in the post-combustion zone of the 20 MMBtu/hour-boiler with these injectors resulted in $NO_x$ reductions from 1 lb/MMBtu by as much as 80% to 0.2 lb/MMBtu when the combustor operated under fuel lean conditions. Operating the combustor under fuel rich conditions reduced $NO_x$ from 1 lb/MMBtu to 0.4 lb/MMBtu. This was followed by the injection of SNCR in the post combustion zone that further reduced $NO_x$ to as low as 0.07 lb/MMBtu.

The identical injector design was also used by Zauderer (B. Zauderer, "A Method for Combined Reduction of Nitrogen Oxide and Sulfur Dioxide Concentrations in the Furnace Region of Boilers", U.S. patent application Ser. No. 09/964,853, Sep. 29, 2001) to spray droplets containing a mixture of lime and urea into the 20 MMBtu/hr-combustor and immediately downstream of the combustor at gas temperature of about 2000° F. $SO_2$ emissions were reduced by 80% while simultaneously reducing $NO_x$. When added to the $SO_2$ removed in the combustor with lime injection (B. Zauderer. U.S. Pat. No. 4,765,258) essentially all the $SO_2$ is removed.

Another post combustion process for reducing $NO_x$ is called "reburn" in which additional fuel is introduced into fuel lean post-combustion gases in order to convert them to fuel rich conditions. This greatly reduces $NO_x$ as reported by Zauderer (B. Zauderer, "Reduction of Nitrogen Oxides by Staged Combustion in Combustors, Furnaces, and Boilers", U.S. Pat. No. 6,453,830 B1). The latter invention disclosed the use of oil, biomass, and coal-water slurry as the "reburn" fuel. In tests conducted with the first two fuels, 50% $NO_x$ reductions were measured in tests in the 20 MMBtu/hour air-cooled cyclone combustor. The "reburn" $NO_x$ reduction is additive to staged combustion inside the combustor and to the SNCR reduction in the post-combustion zone.

Removal of Chlorinated Hydrocarbons-Primarily Dioxins and Furans from the Combustion and Post-Combustion Gas Streams The chlorine in coal and in municipal solid waste results in the formation of dioxins and furan. However, the chlorine in coal is generally between 10 to 100 times lower in concentration than in municipal waste incinerators because the latter contains plastics that have substantially higher chlorine concentrations. The dioxins/furans are formed in the combustion zone at gas temperatures in the 2000° F. to 3000° F. range and separately in a narrow range in the post-combustion zone during regular gas cool down in the exhaust ducting below about 600° F. to 700° F. Zauderer performed a series of tests in the 20 MMBtu/hour combustor-boiler in which coal was co-fired with various amounts (up to 50% of the total mass flow rate) of a shredded municipal refuse derived fuel (RDF) (B. Zauderer, et. al, "Tests on Co-Firing of Coal and Refuse Derived Fuel (RDF) in A Slagging Cyclone Combustor Attached to a Package Boiler", Coal Tech Corp., Merion, Pa. Report, Apr. 8, 1991, unpublished). The dioxins/furans were measured both inside the boiler and in the stack exhaust, and subsequently analyzed by Rossi, et. al. using EPA Method 23 (L. Bonfanti, et. al., "PCDD/Formation and Destruction from Co-Firing and RDF in a Slagging Combustor", ENEL-Nuclear Research Center, Pisa, Italy, July 1992, Also in a paper presented at an International Environmental Conference, Lisbon, Portugal, 1992). The chlorine in the RDF was 10 times (0.5%) greater than that in the coal (<0.1%). With 40% RDF-60% Coal (mass flow) the dioxin and furans were about 60 times greater at the stack (almost 1,500 ng/$NM_3$) than with coal only.

They were also measured with a water-cooled, suction gas probe inserted from the rear of the boiler, parallel and within several inches from the side wall. Here, dioxin/furan readings were 4 times higher than in the stack. However, gas sampling of $SO_2$ and $NO_x$ in coal fired combustion tests 6 years later by Zauderer (unpublished) with the same probe and in the same boiler clearly showed that sampling at that location was not representative of the much hotter core combustion gas stream in the boiler. This non-uniformity was also confirmed in 3-dimensional modeling of the gas conditions in this boiler (S. Brewster, in a Report on DOE Contract DE-AC22-91PC91162). Consequently, the dioxin/furan samples taken in the boiler cannot be correlated to a specific gas state.

A major problem with these coal-RDF co-firing tests was the non-uniformity of the RDF feeding, which resulted in sharp periodic (order of 1 second) fluctuations in the visible flame inside the slagging combustor. It was believed that the high dioxin/furan emissions measured were due to these non-uniformities, a point also noted by others. This threw into question the stack gas results from the coal-RDF co-firing tests. To address this issue of uniform feeding, a series of tests were performed several years later (B. Zauderer, "Control of Dioxin Emissions from Waste Fuel Combustion by Co-firing with Coal", DOE-SBIR Phase 1 Project Final Report, Contract: No: DE-FG05-93ER81554, Mar. 24, 1994). To assure uniform feed, calcium chloride pellets were used as a chlorine source, instead of RDF, and it was co-fired with the same 0.1% chlorine coal as previously. The chlorine level was increased in several steps to as high as 2.6% of the total injected mass flow, equal to 5 times greater than the Cl in the RDF. Nevertheless, even with 2.6% chlorine injection, the dioxin level measured at the stack was only 30 ng/$Nm^3$, the same as with the 0.1% chlorine, coal test. This strongly suggested that non-uniform combustion is a major factor in dioxin formation.

In another test in which the calcium chloride injection produced a 1.2% chlorine mass flow rate, lime (calcium hydrate) was co-injected. The total calcium from both chemicals resulted in a total Ca/Cl mol ratio of 6.9, while that due to Ca(OH)$_2$ alone was 3.4. The addition of calcium hydrate lowered the dioxin level by 45% and the furan by 12% compared to the baseline test without the lime. It also reduced the $SO_2$ emissions by 72%.

In a report on the correlation of stack gas temperature with dioxin/furan emissions for several large municipal waste incinerators in Denmark (V. Boscak & G. Kotynek, "Techniques for Dioxin Emission Controls" in Proceedings of Municipal Waste Combustion Conference, Tampa, Fla., Apr. 15, 1991, Sponsored by EPA & Air & Waste Management Association, pp. 383-397) the measured reduction of the sum of the dioxin and furan emissions were lowered by a factor of 1000 to a little over 1 ng/NM3 as the stack gas temperature was reduced from 230° C. to 120° C. However, the results reported by Boscak are not directly comparable to Zauderer's results because a spray dryer absorber, with a presumably relatively long, single pass, gas residence time, into which a lime slurry was injected with a special injector, was installed upstream of the fabric filter leading to the stack.

Boscak also reported that injection of activated carbon or activated hydrated lime had no effect on these emissions. The lack of effect by these two species suggests that the lime's main function was mostly limited to neutralizing the acids formed from sulfuric acid and hydrochloric acid as $SO_2$ and HCL are cooled below the acid dew point, and that the quenching of the gas stream by the water spray was the primary factor in lowering the dioxin/furan concentrations. This is a reasonable conclusion because the dioxin/furan reduction increased as the temperature was lowered, which indicates increased spray water flow and more rapid gas cooling. If this assessment is correct, it means that the use of such large spray dryers is a costly method for neutralizing these acids whose presence would corrode the ductwork. In any case, the results clearly indicate that stack gas temperature was the primary driver to the dioxin/furan reduction.

A spray dryer operates at low temperatures where the reaction between $SO_2$ and HCl with lime is very slow and as a result a long residence time is needed for the reaction to proceed, which requires a large vessel. Prior art by Zauderer was cited above for removing the sulfur at high temperature. This type of spray dryer has been installed in a number of large (as much as 2000 tons/day of MSW) European and American MSW incinerator facilities. Brown and Felsvang (B. Brown and K. S. Felsvang, "Control of Mercury and Dioxin Emissions from U.S. and European MSW Incinerators by Spray Dryer Absorption", Municipal Waste Combustion Conference, Apr. 15, 1991, pp. 675-705) presented results on dioxin/furan and mercury reduction in five MSW and RDF incinerators that used one type of spray dryer. Clarke also presented a technical paper on the same results of dioxin/furan and mercury reduction obtained in a Swiss MSW incinerator that was also reported by Brown, (M. J. Clarke, "A Review of Activated Carbon Technologies for Reducing MSW Incinerator Emissions" in Municipal Waste Combustion Conference, Tampa, Fla. [loc. cit.] April 1991, pp. 975-994).

Both review papers isolate the effect on adding activated carbon injection upstream of the lime slurry-spray dryer for both pollutants. A general comment on the three technical papers is that the presentation format provides test results, but little if any correlation to incinerator operating conditions. For example, the composition of the MSW and its heating value, which can vary widely even within one day are not given. In fact, the very wide variation in input conditions to the spray dryer reported in the last two papers validates the assessment that the MSW composition and probably combustion operating conditions varied widely. The absence of this information, which was certainly collected during the test, provides no guidance on the possible impact of combustion conditions on the magnitude of the emissions.

For present purposes, as noted above, all three papers report that the low temperature was the key factor in reducing dioxin and furan emissions. However, in contrast to Boscak, the other two papers report that the addition of activated carbon immediately upstream of the spray dryer in a 400 ton/day Swiss MSW incinerator reduced dioxin/furans by 98.9% to 5 ng/NM$^3$ at the ESP outlet from 455 ng/NM$^3$ at the lime-slurry drier inlet at 120° C. (248° F.). In the prior test without the carbon injection, the reduction was 75% to 69 ng/NM$^3$ at the ESP outlet from 277 ng/NM$^3$ at the dryer inlet. Note that the carbon injection was 59 milligram/NM$^3$, which yields a ratio by weight of carbon to the incremental (over the spray drier) dioxin/furan reduction of 922,000 to 1. The ratio based on the dioxin/furan concentration at the inlet to the spray dryer was 130,000 to 1. However, since a large fraction of the dioxin reduction was due to rapid cooling of the stack gases, the contribution of the carbon to the total reduction is not known, only the incremental reduction can be totally quantified. This incremental removal of 34 grams per year of dioxin/furans, results in about 31,000 kg/yr of dioxin/furan impregnated carbon, which is dispersed in the fly ash, and requires proper landfill disposal. Since the U.S.-EPA regulation for MSW incinerators is 30 ng/NM$^3$, as opposed to an apparent limit of under 5 ng/NM$^3$ in Europe, it would appear that improvements in combustion performance combined with stack gas cooling should be sufficient to lower the emissions from 69 ng/NM$^3$ to the U.S. limit without the need for activated carbon injection and its solid waste disposal requirement.

A qualitative measure of the ratio of activated carbon to pollutant can be obtained from the mercury reduction tests that were also conducted in this Swiss incinerator. The mercury emissions also decreased with decreasing outlet duct gas temperature from 140° C. to 110° C. The injection of lime in the spray dryer also contributed to gettering mercury. At 140° C., the Hg reduction across the spray dryer is 28%, while at 110° C. it was 43%. Injecting 30 mg/NM$_3$ at 110° C., doubled the Hg reduction to 87%. In this case the carbon caused an incremental reduction of Hg of 105 µg/NM3 from which a carbon to Hg weight ratio of only 285 is deduced.

It thus appears that cooling of the stack gases is a far less costly process, than activated carbon injection for dioxin/furan removal. Also, use of a large spray drier vessel is a costly method of accomplishing said cooling. Furthermore, Boscak's reported lack of improvement in dioxin/furan reduction by use of activated carbon injection, while achieving an even lower emission of 1.4 ng/NM$^3$ with only the lime slurry spray drier, suggests that activated carbon may not be necessary for dioxin/furan control. However, Boscak emphasized the importance of uniform combustion in removing excess ash from furnace walls that contain dioxin/furans, and removing fly ash at gas temperatures above 300° C., which reduces the catalytic effect of copper in said fly ash on dioxin/furan formation.

The alternative of applying to coal fired power plants the prior art from MSW incinerators of large spray driers with lime injection for acid neutralization would be quite costly because MSW plants have generally much lower thermal inputs than coal fired power plants. For example, the Swiss MSW plant had a capacity of 400 tons of MSW per day, which translates at best to less than 250 MMBtu/hr. This would equal to a very small 25 MW coal fired power plant. This may be one reason why DOE estimates (EPA, loc. cit.) that mercury removal for coal fired power plants would cost $70,000 per lb of Hg removed, while EPA states that said removal is 5 to 10 times less costly for MSW incinerators (EPA, loc. cit.). The MSW cost estimate is in general agreement with the prior MSW plant estimates cited above in which a costly spray dryer was used. Due to the low chlorine level in coal, dioxin/furan emissions, which are caused by chlorine in the coal, are much lower, and as yet not subject to regulation in coal fired power plants.

In 1994, Zauderer proposed (Zauderer, "DOE-SBIR Phase 2 Proposal to DOE Contract: No: DE-FG05-93ER81554", unpublished) follow-on tests to validate this stack gas temperature effect and its relation to uniform combustion by replacing the calcium chloride source of chlorine with polyvinyl chloride pellets that would better simulate municipal solid waste. While the tests were not implemented, in September 2001 a pair of tests were implemented by Zauderer on a 90 MMBtu/hour, mass burn, municipal incinerator in Pennsylvania, which partially validated both the key role of uniform combustion in the primary flame zone on dioxin/furan emission levels and the importance of reducing stack gas temperatures on the magnitude of said emissions.

The prior art has shown that the major pollutants emitted during coal and MSW combustion, namely $SO_2$, $NO_x$, particulates, mercury, dioxins and furans, can be individually sharply reduced to below the current and proposed EPA regulatory levels. However, prior art reduction processes have little synergism between the individual pollutants, and each is quite costly. For example, $SO_2$ reduction with a wet scrubber has little in common with $NO_x$ reduction with Selective Catalytic Reduction (SCR), or with mercury reduction with activated carbon.

While some prior art approaches may generally meet the most stringent current and proposed regulations, their implementation does not lead to any economic benefit from integration. For example, Selective Catalytic Reduction (SCR) will, in one step, reduce $NO_x$ to meet the most stringent regulations. However, it is extremely costly, and it offers no benefit to the control of $SO_2$, or mercury. The result has been, as noted above, that EPA and DOE estimate meeting current and proposed emission regulations for $NO_x$, $SO_2$, and mercury will cost $10/MWH, which equals to 40% of the historical wholesale price of electricity of about $25/MWH.

Finally, the review of the prior commercial technology strongly suggests that the use of activated carbon for the control of dioxin/furans and mercury consisted of adding components to equipment that was apparently originally installed for $SO_2$ and HCl emission control. However, this equipment, such as the spray dryer are large components, which are obviously costly. It is interesting that the three references cited in connection with their use contain no information on cost. Cost is the final determinant in use of any technology.

SUMMARY OF THE INVENTION

In summary, the major advantage of the invention is that the removal of most of the ash, $SO_2$, and $NO_x$, and other volatile trace metals upstream of the final mercury and dioxin/furan removal step in which activated carbon is injected, enables the latter processes to be implemented at the optimum gas temperature for reducing said species without concern for duct wall corrosion. Also, the activated carbon usage is substantially reduced because there are few alternate species that compete with mercury and dioxin furans for adsorption on the activated carbon surfaces. Another important benefit of this invention is to optimize each element of a multi-step emission control process in the slagging combustor by judicious selection of surrogate fuels, reagents, sorbents, and neutral feedstock. For example, the use of sulfur powder mixed with sawdust to simulate the sulfur in coal, and the use of rice husk char to simulate coal ash slag flow allows optimization of each element of the kinetic vitrification process.

The implementation of the disclosed integrated process steps will result in elimination of the major pollutants produced during coal and other solid fuels, such as MSW, combustion. Although the post combustion control steps can be implemented in existing technology coal and solid fuel furnaces and boilers, its implementation in the slagging air cooled combustor provides a "cradle to grave" solution to environmental emission control from said fuels in that in addition to air emission control, no liquid wastes leave the combustion system, and the bulk of the solid wastes are in the form of inert vitrified solid wastes that have beneficial uses, leaving only minimal amounts of solid wastes that need either recycling or landfilling.

The invention discloses a set of processes that eliminate almost all pollutants emitted during coal and solid fuel combustions. The sequence includes, in embodiments, two groups of processes. A first group takes place inside the air-cooled slagging combustor and the second group in the post combustion zone of the furnace or boiler or in the gas ducting upstream of the particulate control equipment. The second group of processes can also be applied to coal fired power plants or MSW plants that utilize other combustion systems, which would not otherwise meet EPA standards.

Group 1

Emission Control Within the Combustion Chamber of an Air-Cooled, Slagging. Coal Combustor The Group 1 processes may include the following processes (in no specific order):

A. Staged Combustion: Staged combustion, in which the stoichiometry in the combustion chamber is fuel rich, followed by excess air combustion at the combustor outlet in order to reduce $NO_x$ emissions.

B. Injection of Lime: Lime or limestone particles injected in dry powder or liquid slurry form near the coal injection ports to reduce $SO_2$ emissions. The particles are calcined by the combustion gas to calcium oxide that reacts with gaseous sulfur molecules to form a solid calcium-sulfur particle. These particles as well as solid and liquid droplets of ash that are released during coal combustion and that are greater than about 10 microns in diameter impact and dissolve in the liquid slag layer that lines the inner wall of the slagging combustor. Air-cooling allows control of the slag layer temperature and viscosity so that the slag is drained within a few minutes into a water filled quench tank. This prevents re-evolution into the combustion gases of the sulfur trapped in the slag. The slag layer flow rate is further controlled by lime or limestone that is injected at rates beyond the requirements for sulfur control and that is dissolved in the slag layer. The lime injected into the combustion chamber to reduce $SO_2$ also reduces the high temperature formation of dioxins and furans that result from reactions with chlorine in the fuel.

C. Kinetic Vitrification of Volatile Trace Metals: The ash particles dispersed in the coal particles that are released into the combustion gas stream during coal burnup will retain a significant fraction of volatile trace metals in the time interval between injection of the coal particles into the combustor and the impact of the particles or droplets of ash into the slag layer lining the combustor wall. To prevent re-evolution of the volatile trace metals from the liquid ash layer, rapid removal of the slag layer from the combustor wall is provided. The validity of this volatile metal retention effect was demonstrated in the air-cooled combustor for arsenic and lead, but not for mercury, which is more volatile.

In the second step in kinetic vitrification to prevent the re-evolution of the volatile metals captured in the slag layer during the time, a liquid ash droplet or ash particle impacts the slag layer to its removal through the slag tap into the water filled quench tank. A slag element's residence time in the 20 MMBtu/hour air-cooled combustor's slag layer ranges from a few minutes to almost 30 minutes, depending on the slag layer thickness, slag layer temperatures, viscosity and slag mass flow rates. Again using the $O_2$ or S diffusion coefficients in liquid metal oxides as representative of volatile metals, e.g. As or Pb, but this time in a planar slab layer with a slag layer thickness of 2 millimeters and a surface temperature of 2300° F., it was computed that almost all volatile metals would remain in the slag if the slag residence time on the combustor wall was about 3 minutes, or less.

D. Ash Vitrification: The slag drained from the combustor is quenched in a water-filled tank and converted into a chemically inert, vitrified slag, which has economic value.

Group 2

Emission Control Processes in the Post Combustion Gas Zones to Eliminate the Pollutants Remaining in The Gas Stream Exiting the Combustor While the preferred operating mode is with the air-cooled, slagging, cyclone combustor, the post-combustion processes disclosed herein can also be applied to boilers or furnaces fired either with stoker fed coal or other solid fuels, or with pulverized coal or other solid fuels fired in suspension in a primary combustion zone. The processes may include the following processes (in no specific order).

A. Fuel Mixtures: Depending on operating mode, the gases exiting the air-cooled combustor (or the primary combustion zone in other solid fuel fired furnaces or boilers) can either be fuel lean or fuel rich. In the former case, additional fuel consisting of a small percentage of the total fuel heat input is injected immediately downstream of the primary combustion chamber (or zone). This "reburn" process converts the fuel lean combustion gases to a fuel rich condition, which reduces the $NO_x$ concentration. If the gases exiting the air-cooled combustor (or primary combustion zone) are fuel rich, $NO_x$ in the combustor (or combustion zone) exhaust will already have been partly reduced.

B. Inspection of Aqueous Droplets: Additional $NO_x$ and $SO_2$ reductions are achieved in the initial post-combustion zone with the injection of aqueous droplets containing a $NO_x$ reducing agent, such as urea or ammonia, and an $SO_2$ reducing agent of small lime particles dispersed in the droplets. Preferably, this combined $SO_2$ and $NO_x$ droplet injection step takes place in the post-combustion fuel rich zone, with said zone either the result of fuel rich operation in the combustor, or the fuel rich gases exiting from primary combustion zone. In case the primary combustion was fuel lean, then this injection takes place in the fuel rich reburn zone. The $NO_x$ reducing reagent may be injected into the fuel rich zone because in this zone all un-reacted urea or ammonia is reduced, which eliminates any ammonia "slipping" into the ducting downstream of the boiler or furnace and escaping into the atmosphere.

The injected lime also reacts rapidly at the lower end of this temperature range with chlorine to prevent the formation of the liquid acid HCl that can corrode metal walls when the combustion gases are cooled below the acid dew point for these gases, which is necessary for efficient control mercury and dioxins and furans.

In all cases, additional air is injected downstream of the reagent injection zone or downstream of the reburn zone to complete the combustion of the fuel rich gases. Alternatively, the treated fuel rich gas zone can be allowed to mix downstream of the fuel rich zone with untreated combustion gases that have excess air and complete the unburned fuel combustion. These post-combustion steps are implemented at combustion gas temperatures in the 1800° F. to 2500° F. range.

C. Cooling: The gases continue to be cooled by heat transfer to the furnace or boiler walls and by further cooling in boiler feedwater or air heaters to gas temperatures in the 700° F. to 350° F. range. The purpose of the previous post-combustion processes is to remove essentially all the $SO_2$, $Cl_2$, and $NO_x$ that remained in the gases exiting the combustor or primary combustion chamber. Also, the combustor removed about three-quarters of the ash in the coal. Both these steps reduce the complexity of the cleanup of the remaining pollutants, such as volatile metals, including mercury, and dioxins and furans.

Conventional systems have shown that in a certain temperature range during gas cooldown, roughly 700° F., additional dioxins and furans can form. As is known, all dioxins and furans can be sharply reduced by rapid gas cooldown. Also, lowering the gas temperature to the 230° F. range results in more efficient mercury capture with activated carbon. To accomplish both objectives, additional water spray cooling in the boiler or furnace exhaust ducts is implemented by the invention to reduce the gas temperature to the 200° F. range. Lime can be also mixed and dispersed in the water spray to neutralize any residual acids that may form from $SO_2$, $Cl_2$ and similar acid forming gases that were not totally removed in the prior steps. This is followed by injection of water droplets containing dispersed activated carbon particles in the gases at this temperature range. This water only, droplet spray, beginning in the 700° F. to 450° F. range will also prevent and reduce the dioxins and furans that form in this temperature range in the exhaust ducting. The balance of these dioxins/furans and volatile metals, primarily mercury, are removed by the activated carbon particles.

BRIEF DESCRIPTION OF THE DRAWINGS

FIG. 1 is side view schematic drawing of a 17,500 pound per hour package boiler to which a 20 million Btu per hour, air-cooled, coal fired cyclone combustor is attached;

FIG. 2 is a graph of the experimental results in the combustor of FIG. 1 on the retention of arsenic and lead in the vitrified slag extracted from the combustor resulting from injection of fly ash from a coal fired utility boiler;

FIG. 3 is a graph of the theoretical slag residence time in the combustor of FIG. 1 as a function of the slag mass flow rate;

FIG. 4 shows dioxin emissions measured in the stack, downstream of an electrostatic precipitator in a 90 MMBtu/hour municipal incinerator for several tests;

FIG. 5 shows stack gas temperatures at the same location as in FIG. 4 obtained by a probe that traversed the stack in equally spaced steps in a predetermined period;

FIG. 6 shows a side view of the furnace and initial convective tube section of a large industrial or utility boiler;

DISCLOSURE OF INVENTION

Figure 7:
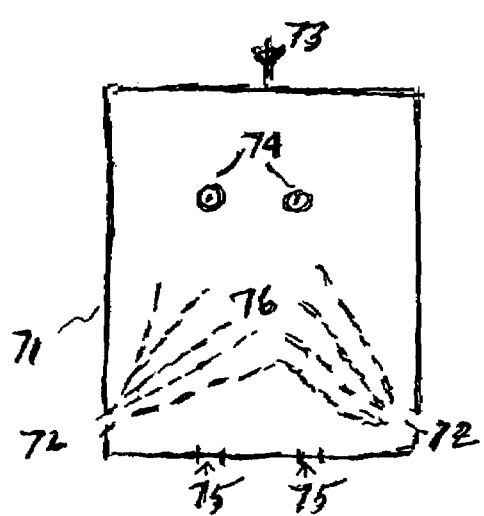
FIG. 7 shows a cross-sectional view of the municipal solid waste (MSW) incinerator to which the results of FIGS. 4 and 5 apply.

The invention discloses a simpler and far less costly method of accomplishing removal of acid causing species, and sharply improves the economics of emission control for solid fuels by use of an integrated series of low cost processes that are applied sequentially to the combustion flow train in a manner that reduces all the pollutants emitted during coal combustion. (In contrast, prior art has focused on treating the pollutants primarily in the exhaust ducting of boilers and furnaces.) The invention integrates the control of the pollutants using processes that are optimum in different regions of the combustion gas flow train and that are very low in cost and that provide cross-benefits to the control of the other pollutants. This is accomplished by using a series of process steps. The result is that all the primary pollutants are eliminated at an estimated cost that is far less than currently possible. Another aspect of this invention is that unlike prior art, such as SCR for $NO_x$ reduction, multiple sequential processes are used to reduce individual pollutants. Some of these processes, such as "kinetic vitrification" to reduce volatile trace metal emission are unique to the air-cooled combustor. It could be applied to existing coal-fired power plants if this combustor is retrofitted to replace the combustors on their boilers.

The invention also shows how the control of the other pollutants beneficially impacts the removal of mercury. The invention also teaches how to optimize each element of a multi-step emission control process in the slagging combustor by judicious selection of surrogate fuels, reagents, sorbents, and neutral feedstock. It is understood that the methods and processes described in this invention also apply to furnaces and boilers that are fired with non-coal fuels, such as municipal refuse derived fuels or biomass.

In practicing the invention, most other pollutants emitted during coal combustion, including most of the ash in coal, $SO_2$, $NO_x$, dioxins and furans, and trace metals in the ash that are less volatile than mercury, will be removed upstream of a particle fabric filter or electrostatic precipitator, that in turn is immediately upstream of the stack. While one important goal is the control of mercury emissions, to achieve this goal the other pollutants emitted by coal combustion will also be removed. Consequently, certain improvements on controlling the other pollutants are also disclosed herein. In addition, new methods are disclosed for controlling dioxins and furans, which are more of an emission problem in municipal solid waste due to its high chlorine content, than in coal combustion.

By way of one example, the $SO_2$ and $NO_x$ are each partially reduced in the combustion chamber, and additionally essentially totally reduced in the post combustion zone by injection of water droplets containing urea or ammonia for $NO_n$ reduction and lime for $SO_2$ reduction. The indirect benefit of this reduction is to remove the source of acids formed by condensation of these species. This allows operation of the activated carbon injection process and dioxin/furan reduction process at temperatures that are substantially below the acid dew point where the latter reactions are much more efficient.

Therefore, the invention is capable of integrating all these pollutant reduction processes in a sequential series of steps that result in the near total removal of the pollutants at costs that are far less than current state of the art. Another aspect of the invention is providing optimization of individual steps, some of which appear to be only of secondary importance, within a specific process in order to achieve an optimized total process. For example, by maximizing slag flow out of the combustor the re-evolution of sulfur is inhibited, which in turn improves the overall sulfur-capture process.

The following are the steps used in practicing this invention.

Group 1 Processes

Group 1 processes take place in the primary combustion zone where the fuel, coal or other solid fuels, such as MSW, are injected and fired with combustion air. Of the Group 1 processes, "kinetic vitrification" can be efficiently implemented in a slagging combustor, and preferably in an air-cooled combustor. The other processes can also be implemented in conventional furnaces or boilers fired with pulverized coal combustors, or a mass burn MSW incinerators. However, non-uniformity in the main combustion zone will lower their efficiency especially in the mass burn MSW incinerators.

$NO_x$ Reduction by Staged Combustion

FIG. 1 is side view schematic drawing of a 17,500 pound per hour package boiler to which a 20 million Btu per hour, air-cooled, coal fired cyclone combustor is attached. FIG. 1 shows the placement of injection streams of solid and gas streams that differ or are additive to the prior art on this combustor. All other streams identified in the detailed description are identical to the drawing of this combustor-boiler that is described in U.S. Pat. Nos. 4,624,191, 6,048,510 and 6,453,830 B1, which are incorporated by reference in their entirety herein.

FIG. 1 shows the following elements, for example:
1. boiler 1,
2. slagging combustor 2,
3. combustion chamber 3,
4. ports 6, 7, 8, 9
5. slag tap 41
6. injectors 14, 15, 141,
7. Air inlet ducts 11
8. exhaust duct 17,
9. conical spray 144,
10. flat fan spray 143 in fuel rich zone 5,
11. fans 161, heat exchanger 163
12. flat fan spray injectors 18, 19
13. flat fan spray 181, 191 and
10. stack 162.

As shown schematically in FIG. 1, injected air from a pressure blower provides a swirling flow 8 whose centrifugal force drives particles and droplets into the liquid slag layer that lines the inner combustor wall. Firing coal that is pulverized to 80% (by weight) passing a 200 mesh, results in about 75% of the ash that remains solid or is liquefied in the combustion gas being driven into the slag layer in the wall. The slag is drained through a slag tap 41 at the downstream end of the combustor's floor, (FIG. 1). Ash particles as small as 10 microns impacted the slag layer within the 4-foot axial length of the combustor wall, with said particle or droplet transit time equal to or somewhat less than the combustion gas transit time of 80-millisecond in that combustor. Larger particles impact the wall sooner. For example, a 20-micron particle impacts the slag layer within 20 milliseconds, while a 50-micron particles impacts within 10 milliseconds. Particles smaller than 10 microns will escape even from an air-cooled combustor twice as long, namely 8 feet, as was verified with such a combustor that has been in operation at Coal Tech Corp's facility in Philadelphia, Pa. since 1995. Therefore, retention of volatile trace metals in the fly ash tests, whose mean particle size was somewhat under about 10 microns, was more difficult to achieve than with larger ash particles, except at very high swirl. Nevertheless, significant concentrations of volatile arsenic and lead were retained in the slag in the 20 MMBtu/hr-combustor (See FIG. 2). This was accomplished by operating the inlet swirl air pressure at 40 inches water gage (w. g.) where 90% of the ash was retained in the slag layer in the 4-foot long, combustor wall. The present invention, though, solves this problem.

The theoretical analysis requires knowledge of diffusion data for these elements in the slag. For this purpose experimental data on the diffusion of sulfur and oxygen atoms in liquid metal oxide slag was used. It was determined that almost all the volatile metals could be retained in liquid ash droplets as small as 20 microns during the 20 millisecond interval between injection and slag layer impact. Even 10 micron-particles, which equaled the mean size of the fly ash used in the tests, retained (according to the analysis) 44% of volatile atoms in the 80 milliseconds interval from coal particle injection to slag layer impact. Therefore, practicing the invention with coarse coal particles, (mean size of 75 to 100 microns), as opposed to the previous fine fly ash, should result in retention of most of the volatile metals within the ash particles between combustor injection and slag layer impact.

A computer analysis was performed of slag flow down the sides of the 20 MMBtu/hr combustor wall, followed by axial flow down the combustor floor that is inclined by about 5°. The results are shown in FIG. 3 for a silica/alumina coal slag at two viscosities and two wall temperatures. In FIG. 3, the higher 2400° F. temperature with added 10% calcium oxide to the slag lowers the slag viscosity and slag residence time. The high viscosity slag curve had a temperature of 2000° F. and no CaO addition. The results shows that at low viscosity, an adjustable wall temperature, and a total slag mass flow rate in excess of 500 lb/hr is needed to achieve residence times of 3 minutes, or less. In reducing this concept to practice a major effort in the development of this combustor was devoted to achieve slag flow rates above 500 lb/hr.

In the first process, staged combustion for $NO_x$ reduction, the slagging combustor's, 2, combustion chamber 3 in FIG. 1 is operated fuel rich, whereby the combustion air introduced through ports 8 in FIG. 1 at less than the stoichiometric amount needed to completely burn the pulverized coal that is injected through ports 7. The maximum reduction takes place at about 70% stoichiometric air-fuel ratio (SR1) yielding two-thirds reduction from 1 lb/MMBtu to 0.3 lb/MMBtu in the air-cooled combustor. However, the unburned carbon exiting the combustor can be as high as 20% at SR1 below 80%. Therefore, it is preferred to operate at SR1 above 0.8, and if possible at 0.9, in order to limit unburned carbon loss and obtain less $NO_x$ reduction inside the combustor. Alternatively, the combustor can be operated fuel lean and the $NO_x$ reduction implemented with the SNCR process and reburn process.

In conventional pulverized coal fired boilers, 31 in FIG. 6, staged combustion is implemented with "low $NO_x$" burners 32 that produce a hot (about 3000° F.) fuel rich combustion zone, 33 in FIG. 6, which typically reduce $NO_x$ by about 40%. While this process is widely used in coal-fired electric utility power plants, it has the disadvantage that the local fuel rich combustion zone has caused corrosion on furnace walls from reducing sulfur compounds because it is difficult to confine the fuel rich zone away from the furnace walls. In practicing the invention the amount of $NO_x$ reduction will be reduced by confining the fuel rich flame zone to the central core of the boiler or furnace and surrounding it with an excess air zone. This could be readily implemented in front face fired boilers. However, in the widely used tangentially fired boiler in which the burners and air inlet ducts are arranged vertically in the corners of the boiler, it may be necessary to redesign the air ducts to create an air cushion between the fuel rich zone and the wall.

$SO_2$ Reduction in the Air Cooled Slagging Combustor

In prior art, in conjunction with the staged combustion $NO_x$ reduction process either powdered coarse limestone (about 80% passing 200 mesh-74 microns) or fine lime (mean size 10 microns) was co-injected though ports 6 in FIG. 1 with the coal 7 in FIG. 1 into the 20 MMBtu/hour combustor. Limestone, in addition to being at least 4 to 5 times lower in cost than lime, although about 25% less efficient than lime, it has the advantage that at least 80% of the calcined limestone will impact the slag layer, as opposed to the very fine lime where much of it escapes with the combustion gases though the exit nozzle 4 in FIG. 1. Consequently, a larger percentage of calcined lime "dead burns" in transit through the 3000° F. combustion gases. This limits its sulfur capture efficiency because in "dead burning" the CaO particle surface melts and closes the access of the $SO_2$ molecules to the internal pores on whose large surface area the CaO—$SO_2$ to CaSO4 or CaS reaction takes place. Another important benefit of adding limestone is that CaO reduces the viscosity of coal ashes, most of which consist primarily of silicon and aluminum oxides.

To benefit from the much lower cost of limestone compared to lime and to increase its sulfur capture effectiveness, the invention grinds the limestone into smaller particles sizes, with a mean size that is smaller than the 80% passing through a 200 mesh (i.e. 74 microns) used in prior art, but not as small as conventional lime in order to prevent a substantial fraction of these particles to remain entrained in the gas flow and exit the combustor. Also, the smaller size limestone particles will calcine much more rapidly and yield a much more open internal pore structure, which will also improve sulfur capture. (Prior art in the slagging combustor as well as in the more conventional injection of limestone never considered this option. In fact, major research efforts were devoted to increasing the internal porosity of lime by pressure treating it, without recognizing that rapid heatup of limestone or lime would also produce a very high porosity.)

The invention separates the capture of sulfur that is released during combustion of sulfur containing solid fuels by calcined limestone or lime entrained in the combustion gases and the removal of the reacted calcium sulfate or sulfite particles in the slag. That is, in one implementation, the invention discloses an improved method of separating the gas phase sulfur capture process with limestone or lime from the sulfur retention process in the slag. Specifically, the sulfur release from the coal is eliminated by injecting pure sulfur powder into the combustor in port 9 adjacent to the fuel feed ports 7 in FIG. 1. In embodiments, The slag is produced by injecting through ports 7 in FIG. 1 char waste that consists of 70% ash and 30% carbon from a rice husk gasifier in quantities sufficient to generate between 500 lb/hour to over 1000 lb/hr in the 20 MMBtu/hour air-cooled, slagging combustor. To achieve uniform rapid ignition, the rice husk char is co-fired with oil and/or natural gas or propane through one of the ports 7.

Pulverized limestone with a mean size between 10 microns to 74 microns is injected through port 6 in FIG. 1 to capture the sulfur and also to condition the slag to a viscosity that assures rapid slag flow and drainage from the combustor.

An alternative procedure for an optimization test is to rapidly calcine the limestone in a small combustion chamber attached to the main combustor and to inject the CaO particles through port 6 in FIG. 1, which will result in immediate reaction between the injected sulfur powder and the CaO particles. For example, using the same sulfur feed rate as found in a 4% sulfur coal with a 10,000 Btu/lb heating value as a test in the 20 MMBtu/hour combustor at its maximum firing rate would require less than 1 MMBtu/hr to calcine sufficient limestone to yield a Ca/S mol ratio of 3. This method should be applied to the initial operation of a new slagging combustor of any commercial size to optimize its performance for sulfur removal in the slag. After optimization, appropriate quantities of coal can be added to the other injected streams until the coal is the sole source of the sulfur.

This method may also be used to optimize for various size slagging combustors, the retention of volatile trace metals in ash particles that impact and dissolve in slag, and to optimize the capture by a getter the volatile metals that are released into the gas stream during coal combustion into the slag. The trace metal source can be either a small quantity of coal or fly ash from coal. As with sulfur retention optimization, the slag flow rate will be controlled by the rice husk char fed rate, with limestone viscosity conditioning of the slag as needed. A suitable getter will also be injected for gas phase capture of the trace metals. One possible getter would be rapidly calcined limestone.

Activated carbon, which has a high internal pore structure, is manufactured from coal char. Therefore, another possible getter would be high porosity char particles that have a very high ash content, such as rice husk char. It could be an effective "getter" for mercury that is bound in the organic part of coal, and which would be released into the gas phase immediately on injection of the coal into the combustor. The char would getter the mercury in the gas phase, and the char particles would impact the slag layer. Normally pure carbon would float on the slag; however, if the mineral content in the char is very high, the particle would sink in the slag. The mercury would not re-evolve into the gas phase if the slag residence time in the combustor is very short. (Note that in known systems, hundreds of samples of slag removed from the 20 MMBtu/hr combustor were analyzed. In almost all cases, the carbon content of the slag was less than a fraction of 1 percent. However, in some case, generally with very fuel rich combustion, carbon was found in the slag.) The feasibility of using this approach to capture mercury in the combustor can be readily determined by test in an air-cooled slagging combustor.

Kinetic Vitrification Applied to the Capture of Volatile Trace Metals in Ash, Including Mercury A benefit from the air-cooled cyclone combustor is its capability of meeting EPA's goal of "cradle to grave" removal of environmental pollutants. This combustor removes key pollutants released into the combustion gas stream and converts the solid residue into an inert, marketable slag. "Kinetic vitrification" has been shown to retaining trace metals that are less volatile than mercury in the vitrified slag removed from the air-cooled slagging combustor. The analysis for implementing kinetic vitrification was previously summarized and also applies to sulfur capture and retention in the slag in this combustor of the invention.

The steps in the analyses of the capture in the gas phase and vitrification in the slag include:

1. Solution of the 3 dimensional equations of motion for particles in the size range of interest in the swirling combustor flow In the 2.5-foot I.D. 20 MMBtu/hour combustor, 20-micron diameter particles impact the liquid slag layer in a 0.75 ft axial distance after a time of flight of 22 milliseconds from injection at 50% of the internal radius in the combustor end wall. For a 15 micron particle, the corresponding numbers are 1.3 feet, and 39 m.sec., and for a 10 micron particle, they are 2.77 feet and 83 m.sec. Particles smaller than that will escape the 4 ft. long combustion chamber used in those prior tests.

2. Particle heatup in the combustion gas

This step may be important for sulfur capture because when a CaO particle reaches a temperature above about 2200° F. in the excess air environment at the upstream end of the combustor, the equilibrium CaO—$SO_2$ capture reaction reverses. However, the calculation presented in the 1989 DOE-SBIR Phase 1 Final Report (loc. cit.) is partially incorrect. It used an overall time dependent heat balance to calculate the heatup time of a fly ash particle from ambient temperature to melting at about 2500° F. This yielded heatup times of less than 1 m.sec. for 20 microns and 18 m.sec for 100 microns. However, that solution did not include the time required for the final surface temperature to reach the center of the particles. Zauderer (U.S. Pat. No. 6,048,510) solved the temperature penetration time to the center of water droplets from a surface temperature of 212° F. Since the heat capacity of water is five times greater than CaO or coal ash particles, the rate of penetration into water at 212° F. is similar to that of the mineral matter at 2000° F. The time of heat penetration to the core is 0.3 m.sec for a 20-micron water droplet versus 0.65 m.sec for a CaO particle to 2200° F. It is 29 m.sec. for a 100 micron droplet versus 34 m.sec. for a CaO particle.

It should be noted that testing of kinetic vitrification process was implemented in which fly ash from a coal power plant and from a municipal incinerator were vitrified in Coal Tech's 20 MMBtu/hr, air-cooled combustor (U.S. Pat. No. 4,624,191). However, it was not recognized that this process could apply to mercury due to its very high vapor pressure. It was only after extensive experimentation that 20% sulfur was retained in the slag of a very high 37% Indian ash coal that applying this to mercury was found acceptable.

3. Diffusion of trace metals out of spherical coal ash particles and out of the slag layer The final calculation is the solution for the diffusion of trace metals out of solid and liquid ash particles and droplets. (The analysis is detailed in the 1989 DOE-SBIR Phase 1 report.) Data on self-diffusivity in the literature for $O_2$ and S in liquid $Al_2O_3$—$SiO_2$—CaO, which is representative of coal slags with CaO injection, was used to estimate the residence time of volatile trace metals bound in the original coal ash. The validity of this assumption is that $O_2$ and S will diffuse faster than volatile metals, such as As and Pb. The results for spherical ash droplets at 2800° F. show that a 10-micron droplet entrained in this gas will lose almost 90% of the S atoms in the 83 m.sec. to wall impact, but loses only 56% of S atoms in a 2550° F. gas. A 20 micron ash droplet will lose only 31% of S atoms in the 22 m.sec. to wall impact at 2800° F., and only a few percent at 2550° F. The same analysis for slag layers on the wall of several different thickness showed that a typical 2 mm. thick layer at 2300°

F., which is typical for coal slags mixed with CaO, will lose 31% of S in 3 minutes. This analysis shows that retention in liquid ash droplets and a liquid slag layer within the time periods existing in air-cooled slagging combustor is technically feasible.

FIG. 2 is a graph of the experimental results in the combustor of FIG. 1 on the retention of arsenic and lead in the vitrified slag extracted from the combustor resulting from injection of fly ash from a coal fired utility boiler. The data are plotted as a function of the slag mass flow rate. FIG. 2 shows the arsenic and lead levels that were measured in the 20 MMBtu/hr combustor in tests using fine coal fly ash of mean size of 10 microns that was injected with coal and limestone. Despite the small particle size, up to 30% of the arsenic and 45% of the lead was retained within the slag, and the retention rate was increasing with increasing slag flow.

Also, injection of limestone into the 20 MMBtu/hr air-cooled combustor having a 4 foot internal length showed that the slag's CaO content nearly doubled to 45% from 24% in 7 minutes after the start of limestone injection into the combustor, while it took 22 minutes for the CaO content to decrease by one-half from 56% to 22% after limestone injection cutoff. The latter result indicates that under steady state limestone injection, the slag residence times would be reduced.

The analysis and test results indicate that ash particles and liquid ash droplets with a 20 micron mean size will retain most of the volatile trace metals between injection into the combustor and impact in the slag layer, where they will be trapped if the slag residence times in the combustor is under 3 minutes. In addition, it is highly probable that given sufficient limestone injection, a large fraction the volatile metals that do evolve into the gas phase will react with the porous CaO and be removed by impact into the slag layer.

Therefore, the invention shows that these techniques could be applied to very volatile mercury, which was not previously considered for this application. Due to the larger molecule, Hg will most likely diffuse slower than $O_2$ or S out of an ash droplet. Furthermore, the Hg bound to the organic coal matter that may well be released in combustion may be gettered by the porous internal structure of calcined limestone. For example, according to EPA mercury concentrations in U.S. coal are about 100 parts per billion (PPB). In contrast, the concentration of CaO injected in a 2% sulfur coal at a Ca/S mol ratio will be 1 million times that of Hg. The fact that Hg is a gas at the very high temperatures where this reaction takes place does not negate the feasibility of the proposed process because $SO_2$ is also a gas, and it was captured with CaO in the combustor. That such an effect was never observed before with limestone or lime injection in furnaces can be explained by the lack of a means for rapid removal of CaO with internal adsorbed Hg from the high temperature zone.

In addition, in view of the slow combustion rate of solid carbon, it is disclosed that internally porous carbon in a high ash char, as obtained from pyrolizers, be injected into the air-cooled combustor with the coal for Hg capture. While the carbon would normally float on the dense char, it might remain submerged long enough in the slag layer at high slag flow rates to leave the Hg embedded in the char.

Finally, it is essential to note that all these steps of pollutant removal in a slagging combustor can be implemented at a commercial scale, even after they have all been verified in a 20 MMBtu/hr commercial scale slagging combustor. The reason being that these processes are all time dependent, and they may produce different results in much larger combustors.

Dioxin/Furan Reduction in the Combustor/Combustion Zone of Furnace and Boilers

It is known that co-firing of coal with refuse derived fuel (RDF) in the 20 MMBtu/hour air-cooled slagging combustor reduced the most toxic components of dioxin by 98.5% with coal only, and by 74% by combined coal-RDF firing. It was also concluded that non-uniform feeding of the RDF in these tests was a major contributor to the high total dioxin/furan (nearly 1500 ng/NM3) levels measured at the stack. This was partially confirmed in subsequent tests, (Zauderer, Control of Dioxin Emissions from Waste Fuel Combustion by Co-Firing with Coal", DOE-SBIR Phase 1 Contract No: DE-FG05-93ER81554, Mar. 24, 1994) in that co-firing of coal with uniform feeding of calcium chloride to produce 2.6% of chlorine in the combustion gas, compared to 0.1% in coal and 0.5% in the RDF, now resulted in dioxin furan levels about the same as with coal only. Even more important, injection of calcium hydrate reduced the dioxin emissions by 45% and furans by 12%. Furthermore, these results were obtained at stack gas temperature at which the dioxin/furan emissions in large municipal incinerators were 10 times higher.

To validate the role of uniform combustion on reducing dioxin/furan formation in the combustion zone of a slagging combustor, small (millimeter diameter) plastic pebbles of polyvinyl chloride should be co-fired with coal in order to provide a uniform source of a high dioxin precursor. Such tests would clarify the dioxin formation and destruction in the slagging cyclone combustor, and it would form a basis for comparison on co-firing refuse derived municipal waste fuel with coal.

In the absence of such tests, a pair of dioxin/furan reducing tests was performed on a 90 MMBtu/hour, mass burn municipal solid waste (MSW) incinerator that was emitting well over 1500 $ng/NM^3$ of dioxins and furans. One test involved the injection of a lime-slurry into the furnace section of the boiler at a local gas temperature of about 1700° F. for the purpose of reducing the chlorine precursors of dioxins. The second test involved quenching the stack gases with flat fan water spray injectors to reduce dioxins/furans. Although, the latter test is a "Group 2" post-combustion process, it will be discussed now to avoid duplication.

The most serious deficiency, and the one that almost certainly was a cause of the high baseline dioxin/furan emissions is the considerably non-uniform combustion in the furnace. Visual observation of the flame pattern and measurements with a thermocouple inserted into the furnace revealed wide gas temperature fluctuations in the range of several 100° F. in distances as little as one foot.

FIG. 7 shows a cross-sectional view of the municipal solid waste (MSW) incinerator to which the results of FIGS. 4 and 5 apply, into which a lime-slurry was injected with two injectors to produce a flat fan spray perpendicular to the upward flowing combustion gases. The boiler, 71 in FIG. 7, is fired with MSW 73 on a downward slopping traveling grate on which raw MSW is dumped on its top end. Combustion air 74 is introduced beneath the grate and additional air 75 is introduced through a series of ports on the opposite wall above the top of the lower end of the grate, and several feet above the visible flame and above the ash discharge outlet. The water-lime slurry was injected through two access ports 72 on opposing sides of the furnace 71 near its lower end using the Spraying Systems V1/2 JBC injector assembly with a SU85 injector head that produces a flat horizontal fan spray 76 of droplets of varying size. The two injectors were inserted between about 6 to 8 feet into the 20 feet wide furnace to produce the flat spray pattern just under the top of the visible flame, where the temperature was about 1700° F. The spray covered the central section of the furnace bed. These injectors, their design, the lime slurry preparation, the injector mode of operation and their use in a furnace, are described in detail in Zauderer, (U.S. Pat. No. 6,048,510 and 6,453,830 B1 and patent application Ser. No. 09/964,853) which by reference are incorporated herein.

These tests were performed on a fully commercial MSW incinerator, where each of the two tests was limited to two hours. An advantage to the shorter test time was they followed immediately after three 4-hour baseline tests. This should have provided a good baseline against which the results of the two tests could be measured. However, unknown at the time, the total dioxin/furan emissions had steadily increased by a total of 40% in the course of 3 days of baseline testing. Compounding this problem was another one in that the technician in charge of the stack gas sampling failed to adjust the stack sampling probe, as per EPA Method 23, which is based on part on EPA Method 5, a procedure for particulate sampling in the exhaust duct as a furnace or boiler. Method 5 requires 24 stack gas samples be taken in equally spaced and equally timed intervals across the stack diameter, which in this case had about a 7.6 ft. internal diameter. Therefore, in the 2-hour test, the spacing should have been doubled and the time per sample reduced in half, which it was not. As a result, only one-half of the stack cross-section was sampled in the $2^{nd}$ test with water droplet injection upstream of the ESP. Even worse, only 25% of the cross-section was sampled in the lime injection test in to the furnace, which was terminated after 1 hour and 10 minutes. Compounding the problem was the manual mixing of the lime in the water. Since there was sufficient lime for a 2 hour test, the fact that the lime was depleted in 70 minutes indicated that the manual lime-water mixing in a 55 gallon barrel was very non-uniform.

FIG. 4 shows the gas temperatures in the 7.6 diameter stack as obtained by a probe that traversed the traversed the 7.6 I.D. stack on Sep. 10, 2001. The AM measurements consisted of 24 readings taken in a 4 hour period in the morning, as per EPA Method 5. This is the baseline with no injection. The furnace injection readings traversed only a little over 25% of the stack because the technician failed to increase the spacing to allow a complete traverse of the stack in the planned 2 hour test period. Similarly, only 50% of the stack gas temperature was recorded because the probe was not doubled for the two hour test.

FIG. 5 is a plot of the total dioxin/furan emissions versus stack gas temperatures for all 5 tests, the three baseline tests, and the two tests with injection in the furnace and stack on Sep. 10, 2001. The totally unexpected result, unknown at the time of the test, was the steady increase in the course of the first 3 tests of the dioxin/furan emissions. The abscissa in FIG. 5 shows the average stack gas temperatures at the same location as in FIG. 4 obtained by dividing the temperature reading at each probe location by the number of read-ins. The three temperature distributions apply to the final three tests shown in FIG. 4, all of which were performed in one day.

Specifically, the curve marked "Raw Data" shows that the dioxin/furan emissions increased by 40% from the $1^{st}$ test to the $3^{rd}$ test. Based on dioxin/furan stack gas measurements, as cited in the three MSW incinerator papers, the first two tests contradict the results reported in the prior art. The first two tests should have had higher emissions than the $3^{rd}$ test because the stack gas temperature was 11° F. and 15° F. higher in the first two tests. Instead, the emissions in the first two tests were lower. Furthermore, the CO level was lower on the $3^{rd}$ test, 16.1 ppmv versus 17.9 ppmv on the first tests, which, incidentally, shows that CO is not a good indicator of dioxin emissions.

The first test in FIG. 4 was the final test of the three baseline tests, in each of which the entire stack cross-section was sampled in a 4-hour period. The next curve applies to the 1 hour and 10 minute long test in which lime was injected into the furnace for dioxin control, and only 25% of the stack cross-section was sampled. The third curve applies to the final 2 hour long tests in which a water spray was injected upstream of the electrostatic precipitator and only 50% of the stack cross-section was sampled. FIG. 5 further shows the problem of evaluating the results because the three baseline tests produced increasing dioxin/furan emission levels. This issue will be addressed after presentation of all the results. However, it should be emphasized that there is a need for steady state combustion operation prior to conducting a dioxin/furan sampling test for MSW incinerators.

Figure 8:
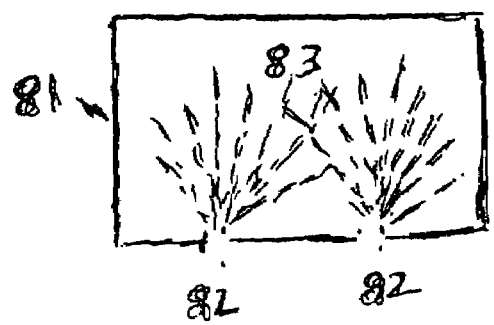
FIG. 8 shows placement of two flat fan, water spray injectors perpendicular to the combustion gas flow in the rectangular duct leading to an electrostatic precipitator.

As noted, the $4^{th}$ of the 5 tests consisted of injecting a lime slurry spray into the furnace, and it was terminated after 1 hour-10 minutes due to exhaustion of the lime. The $5^{th}$ test consisted of the injection of a flat fan, water droplet spray 83 in FIG. 8 with two injectors 82 that were inserted perpendicular to the rectangular duct 81, upstream of the particulate ESP and the stack. The distance between the injection plane and the stack probe was about 40 feet. The same design Spraying Systems 1/2JBC injector assemblies were used to produce the flat fan spray. That test proceeded flawlessly. Based on the dioxin/furan results that were not available until one month later, it is clear that the water flow rate should have been substantially increased because the temperature drop caused by the spray was insufficient to sharply reduce the dioxins and furans, as shown in FIGS. 4 and 5.

In the $4^{th}$ test, lime slurry was injected into the furnace. Nevertheless, the dioxin/furan emissions increased with the lime injection 2600 ng/DSCM from 2400 DSCM (dry, standard cubic meter) in the morning. As noted, this $4^{th}$ test was only of 1 hour and 10 minutes duration versus the 4-hour duration of the 3rd test that morning. Since there is nothing in the lime injection that would make the dioxin/furans increase, this $4^{th}$ test should, in the worst case, be used as a baseline for the $5^{th}$ test that followed immediately with 2 hours of water spray injection into the stack.

For the $5^{th}$ test with water droplet injection into the exhaust duct, the absolute dioxin/furan result was 12% lower than in the $3^{rd}$ test that morning and 20% lower than the immediately preceding test of lime injection in the furnace. The latter curve is labeled "Minimum Corrected Data" of FIG. 5. Before elaborating further on this result, it is necessary to examine the stack gas temperature, as shown in FIG. 4, for the three tests on the $10^{th}$. The $3^{rd}$ baseline test is labeled "Sep. 10, 2001-AM-Baseline", the $4^{th}$ lime injection test in the furnace is labeled "September 10, PM-Furnace", and the $5^{th}$ test with water spray injection upstream of the ESP is labeled "Sep. 10, 2001-PM-Pre ESP Injection" FIG. 4 shows that for the $5^{th}$ test, the droplets did not reach the wall of the rectangular duct because the temperature gradually decreased from the "Baseline" condition without spray cooling of 435° F. at the wall to 360° F. beginning at 17% of the stack diameter, or ⅓ of the stack radius. The higher gas temperature near the wall will not reduce dioxin reduction. In addition, prior art (e.g. Boscak, loc. cit) has shown that the turbulent gas flow near the wall can scrub dioxin-laden particles off the wall and into the sampling probe. Thus, by limiting the sample to ½ the stack diameter, both effects will increase the average dioxin level across the stack.

Therefore, at a minimum, the $5^{th}$ pre-ESP spray injection test should be compared to the baseline dioxin reading of the $3^{rd}$ test. This is shown as the dashed "Minimum Corrected Data" line in FIG. 5, from which one deduces that the dioxin reduction in the pre-ESP spray test was 20% below the morning test result.

Similarly, the dioxin data from the furnace injection test that preceded the EPS spray test and which lasted only 1 hour and 10 minutes is even more limited to the near wall region, in that only ⅓ of the stack diameter was sampled, as shown by the temperature readings in FIG. 4. Even if one assumes that no dioxin reduction took place in the furnace injection test, one can use it as a baseline for the pre-ESP spray injection. In this case, a 30% dioxin/furan reduction is obtained for the pre-ESP spray injection result.

As stated above, lime injection does not increase dioxin/furans. However, it does reduce the equilibrium chlorine concentration, which is a dioxin/furan precursor. One of the primary functions of lime is acid neutralization by injection into the spray dryers. In the present case, where injection took place in the nominal 1700° F. temperature region in the furnace, the reaction kinetics between chlorine and lime are almost certainly much faster than those in the low temperature spray dryer. Furthermore, the pore structure of the lime in the 1700° F. environment is certainly much more open than in the spray dryer. Finally, lime injection in this temperature range has been proven to reduce $SO_2$ (U.S. patent application Ser. No. 09/964,853), and to also reduce dioxin/furans in the 20 MMBtu/hr combustor (Zauderer, DOE SBIR Report, Contract: No: DE-FG05-93ER81554 (loc. cit.).

In view of this, at a minimum, the present teaching of lime injection in the furnace is a far simpler and lower cost method of eliminating acid formation than spray dryers, while at best, it is a simple and low cost method of reducing dioxins/furans. The result of the limestone injection test does not contradict the latter conclusion because the baseline emissions steadily increased during the 3 days of testing. It is, therefore, quite possible that the actual untreated emissions level was higher than the 2600 ng/DSCM measured for the lime injection test, which as noted was in any case not an accurate measure to the average dioxin/furan concentration due to the limitation of stack sampling near the wall.

Alternatively, lime could be added to the water spray injector used in test 5 to neutralize the acid that is formed from $SO_2$ and HCl as the gas is cooled below the acid dew point in order to increase the reduction of the dioxin and furans. In other words, the lime injection method used in the furnace injection test 4 could also be used to neutralize the acids in the same manner as the spray dryers with lime injection that are used in MSW incinerators, but at a far lesser cost than spray dryers. However, lime injection in the furnace is preferred because it can prevent the formation of high temperature dioxins and furans while also removing the gases that form acids in the exhaust ducting.

As to the cause of the steady 40% increase in dioxin/furan emissions during the three baseline days of testing, it is almost certainly the result of non-uniform combustion. This was clearly lacking in these tests, a conclusion validated by the fluctuation of the visible flame pattern and local gas temperature measurements. Mass burn combustion is inherently more susceptible to combustion non-uniformities, and when coupled to a MSW fuel of widely varying composition, variable dioxin/furan emissions are to be anticipated.

Further evidence of the adverse impact on dioxin/furan levels from non-uniform combustion can be obtained by comparing the present results with those cited by Boscak (Loc. cit.). At the baseline temperature of 432° F. in the $3^{rd}$ baseline test, the measured dioxin/furan emission was 2400 ng/NM³. At this temperature Boscak (loc. cit.) reports measured emissions of 1000 ng/NM³. The water spray test 5 lowered the gas temperature to an average 367° F. At that temperature, Boscak reports a total emission of about 80 ng/NM3, a factor of 12.5 reduction. Now the maximum 30% reduction deduced for the test 5 would result in 1680 ng/NM3 emissions. Even if one assumes that the lime injected in the spray dryer accounts for the factor of 2.4 difference between the Boscak's result and the present baseline test, the application of the 2.4 factor to test 5 would have reduced the total emission to 700 ng/NM3, which is still a factor of 8.75 greater than Boscak's value. Therefore, the most reasonable conclusion is that the high dioxin/furan emissions in this incinerator were due to non-uniform fuel and non-uniform combustion.

Afterwards, it was publicly reported that a test conducted on this MSW unit had achieved emissions of 130 ng/NM³ by injection of activated carbon, presumably somewhere in the boiler exhaust ducting. This represents a nominal factor of 15 reduction from the nominal average 2,000 mg/NM3 measured in the three baseline tests of September 2001.

No information of the details of this test was released. However, one can reconstruct the most likely test procedure and results used in the present 90 MMBtu/hr (nominal 216 tons per day of MSW) in which activated carbon was injected from the prior art (B. Brown and M. J. Clarke, loc. cit.). In view of the fact that this facility possessed no spray dryer with lime injection to prevent rapid acid induced duct corrosion one can assume that the stack gas temperature remained above the acid dew point for sulfur and HCL acids, about 350° F., or higher. Therefore, if the stack gases were cooled to that temperature, either by the water used to transport the activated carbon or by a separate water spray, it would have resulted in at most the same peak 30% reduction that was estimated from the $5^{th}$ test. This would lower the dioxin/furan levels from the publicly reported 2000 ng/NM³ to 1400 ng/NM³. However, since the flat fan spray injector was certainly not used, the water spray reduction was likely minimal, It is therefore clear that the bulk of the reduction in dioxins and furans was due to activated carbon injection. Some guidance on the quantity of activated carbon can be deduced from Brown and Clarke (loc cit.). They quote test results in a MSW incinerator in Zurich, Switzerland with stack gases cooled in a spray dryer with lime injection to 248° F. This yielded total dioxin/furan emissions of 69 ng/NM³ at the spray dryer outlet from an inlet level of 277 ng/NM³. On injecting activated carbon at the rate of 59 milligrams per NM³ of gas, the dioxin/furans were reduced by 98.9%, from 455 ng/NM3 to 5 ng/NM³. However, the incremental removal with the carbon was only 64 ng/NM3, i.e. the dioxin/furan reduction increased from 75% to 98.9%.

Therefore, the weight ratio of activated carbon to the 64 ng/NM³ incremental reduction was 922,000 to 1, or almost 1 million to 1. On the other hand, assuming that the lime had no impact on the dioxin/furan reduction, then the weight ratio of carbon to the total dioxin/furan reduction is 130,000 to 1. Another set of tests was conducted in the Zurich 1 MSW incinerator with spray dryer output reduced to only 284° F. In this case, the dioxin/furan reduction increased from 74.8% without activated carbon injection, to 85.2% with 18 milligram/NM3 the carbon injection. In this case, the ratio of carbon to dioxin/furans is 409,000 to 1 for the incremental reduction with the carbon, and it is 95,000 to 1 if the activated carbon caused the entire dioxin/furan reduction.

To scope the cost of the activated carbon for the 90 MMBtu/hr incinerator used in the tests, the two extreme ratios of carbon/(dioxin/furans), i.e., 95,000 and 922,000, yield a range of annual carbon consumption between 103 tons to 1000 tons. The cost of activated carbon is about $1000/ton, which results in a cost range of $100,000 to $1 million per year. This incinerator's capacity is 9 tons/hour and 216 tons/day. Therefore, the activated carbon cost adds from $1.5 to $14/ton to the operating cost. This estimated cost is for the 130 ng/NM$^3$ of dioxin and furans that was reported with the activated carbon injection test that was conducted after the September 2001 tests on the 90 MMBtu/hr MSW incinerator, which is substantially above the EPA emission level for new incinerators of 30 ng/NM$^3$. Since landfill costs are in the $20/ton range, the activated carbon cost is from 7.5% to 70% of the alternative of landfill disposal. Therefore, the cost of current emission regulations may explain why few, if any, new MSW incinerator plants have been built in the past decade.

Furthermore, the activated carbon process yields a dioxin/furan contaminated solid waste that requires landfilling or reprocessing, which in either case adds to the cost. On the other hand the emission controls disclosed in this invention offer simple, low cost solution to controlling these emissions, and which does not produce any solid dioxin/furan waste.

It is clear from the results of the limestone injection tests into the 90 MMBtu/hr traveling grate MSW incinerator that combustion uniformity is extremely critical to minimizing the high temperature dioxin/furan formation. A common indicator of non-uniform combustion is the sharp fluctuations in the visible flame over distances of several feet. This indicates that uniform combustion will occur when these fluctuations are minimal, a fact that can verified visually or preferably with high temperature thermocouples.

In the case of the cyclone combustor, uniformity can be readily achieved by assuring uniform feed of the solid fuel. If the solid fuel is a municipal solid waste it must first be processed as a refuse derived fuel (RDF) and then pneumatically injected into the combustor. However, it is unlikely that combustion uniformity will be achieved with co-firing the RDF with pulverized coal, as was done in the 20 MMBtu/hr air-cooled slagging combustor described under prior art. In this case, dioxin/furans would be controlled with limestone injection or calcined limestone having particles in the 10 to 74 micron range, as described for sulfur dioxide capture in the combustor.

In the case of a traveling grate MSW mass burn incinerator, the simplest method of achieving uniformity is to install gas burners at regular intervals beneath the grate and control the firing of individual burners as needed based on visual flame or thermocouple measurements of the flame temperature above the grate. The gas could be natural gas or pyrolysis gas produced from part of the MSW in a gasifier using well established gasification/pyrolysis technology. This procedure will then allow the use of the aqueous droplet injection containing dispersed limestone in the same particle size range in a flat fan spray pattern as was utilized in the 90 MMBtu/hr MSW test described herein. This process is still warranted even if the limestone injection does not reduce the dioxin/furans because at the very least the limestone will calcine and react to remove the acid causing chlorine and sulfur dioxide from the combustion cases in the temperature range of about 1700° F. to 2200° F. and thereby allow spray cooling of the low temperature (below 700° F. to 800° F.) combustion gases in the exhaust ducting to below the acid dew point of these gases without corroding the duct walls to a temperature where dioxin/furan reductions are very effective.

Group 2 Processes

Group 2 processes take place in the post combustion zone between the exit of the combustion gases from the primary combustion zone and the duct immediately upstream of the particle filter, with the specific process location depending on the process. The group 2 processes control different pollutants that, in combination, reinforce the reduction of other pollutants.

Post Combustion $NO_x$ and $SO_2$ Control

This step includes several processes, namely staged combustion, reburn, and SNCR for $NO_x$ control, and lime injection for $SO_2$ and chlorine control.

Staged Combustion

If the combustion chamber 3 in FIG. 1 is operated fuel rich for $NO_x$ control then additional air is introduced through opening 11 into the boiler 1 in FIG. 1 for final combustion. Similarly, in a large furnace or boiler, if zone 33 in FIG. 6 operates fuel rich, then final combustion air is introduced through openings 311 in FIG. 6.

Reburn

This process is described in U.S. Pat. No. 6,453,830 B1, which by reference is incorporated herein in its entirety. Briefly, if the combustion chamber 3 in FIG. 1 is operated fuel lean, i.e., with excess air, or if in FIG. 6 the combustion gases in the region between the primary combustion zone 33 and the reburn zone 36 are fuel lean, the additional fuel, such as oil, coal-water slurry, is introduced in region 5 in FIG. 1 though injectors, such as injector 14 in FIG. 1, or the fuels are introduced through injectors 312 into reburn zone 36 in FIG. 6 to produce a slightly fuel rich gas, which reduces the $NO_x$ concentration. As with staged combustion, final combustion air is introduced through openings 11 in FIG. 1, and openings 311 in FIG. 6. In addition, the untreated combustion gases, having an excess of oxygen, bypass zone 36 and mix further downstream with the treated gases to result in final combustion of the treated fuel rich gases.

Selective Non-Catalytic Reduction (SNCR)

This process is described in U.S. Pat. No. 6,048,510, which by reference is incorporated herein in its entirety. However, the present teaching has one major improvement in that the injection of the urea or ammonia reagent takes place in the fuel rich post-combustion zone. This allows injection at somewhat higher gas temperatures of up to about 2500° F., and, more importantly, by injecting into the fuel rich zone, any residual ammonia is reduced, thereby eliminating ammonia slip. Referring to FIGS. 1 and 6, injection of the $NO_x$ reducing agent, urea of ammonia that is dissolved in water, occurs with the spray injectors, such as 141 in FIG. 1 to create a conical spray 144, or injector 15 to create a flat fan spray 143 in fuel rich zone 5 in FIG. 1 or a injector 313 to create a flan fan spray 391 in fuel rich zone 36 in FIG. 6. The above $NO_x$ reduction processes will eliminate the balance of $NO_x$ emissions.

$SO_2$ Reduction

The balance of the $SO_2$ not reduced in the primary combustion zone 3 of FIG. 1 will be reduced in the post-combustion zone 5 by the injection of lime dispersed in a aqueous slurry as discussed in U.S. patent application Ser. No. 09/964,853, which by reference in incorporated herein in its entirety. The lime slurry is mixed with the $NO_x$ reducing agents, urea or ammonia, as per the SNCR process and injected with the same injectors and spray pattern used for the latter process. The improvement herein is that the lime will react also with the chlorine released during coal or MSW combustion, in addition to the sulfur gas and sulfur compounds as described. This process will remove sulfur and chlorine species that would form acids if the stack gases were cooled below the dew point of these acids. For larger furnaces or boilers, such as utility boilers, the injection of this liquid would take place with injector 312 in FIG. 6. The removal of these species enables the implementation of low temperature processes for dioxin/furan and mercury removal.

A key result of these post-combustion $SO_2$ and $NO_x$ reducing processes is that their concentration can be totally eliminated from the combustion gases entering the exhaust ducts. Therefore, the gases in these ducts can be spray cooled with water droplets to gas temperatures below the acid dew point where removal of residual volatile trace metals, primarily mercury, and dioxins and furans is very efficient by methods disclosed herein.

Post-Combustion Reduction of Dioxin and Furans

For clarity, the previous section dealing with Group 1 primary combustion emission control contained both the primary and post-combustion processes for reducing the dioxins and furans. Here, additional details are given that show how those emissions that were not reduced in the primary combustion chamber 3 in FIG. 1 or 33 in FIG. 6 or in the similar primary combustion zone in MSW mass burn incinerators, as well as those dioxins and furans that form as the combustion gases cool to a range around 600° F. are to be controlled by the invention.

Referring again to FIG. 1, the combustion gases leave boiler 1 through exhaust duct 17 at gas temperatures between 350° F. and 2000° F., depending on the furnace or boiler design, the boiler or furnace size, and the fuels used. Said gases are then cooled to between about 700° F. to as low as about 350° F., which is above the acid dew point for condensation of gases such as $SO_2$ and HCl. The cooling is implemented by various means that are well know to those knowledgeable in the art, by the use of equipment such as economizers or heat exchangers. In practicing the invention for reducing dioxins and furans, it is assumed that all acid causing gases, such as $SO_2$ or HCl were removed in the hot (i.e., 1700° F. to 2500° F.) post-combustion zones. In that case, one or more flat fan spray injectors 18 in FIG. 1, that produce a flat fan spray 181 perpendicular to the combustion gas flow in the exhaust duct, with the spray covering the entire duct cross-section, cool the gas to temperatures as low as about 230° F. At that point the dioxins and furans will be reduced to the several $ng/NM^3$ range.

If any residual $SO_2$ or HCl gases remain in the exhaust duct upstream of location 18 in FIG. 1, the lime can be mixed in the water spray to neutralize said acids, with the lime prepared as described in U.S. patent application Ser. No. 09/964,853. Furthermore, if additional dioxin and furan reduction are required then another injector or injectors 19 of identical design are inserted downstream of 18. They inject a flat fan spray mixture containing dispersed activated carbon, with the mixture prepared as described in U.S. patent application Ser. No. 09/964,853, and in which the solution contains a surfactant and/or stabilizer to prevent agglomeration of the activated carbon. Alternatively, depending on the duct size and design, a conical spray coaxial with the gas flow in the duct can be used.

The solid particles are removed in a commercial fabric filter baghouse or electrostatic precipitator (ESP) 16 in FIG. 1. Since the gas temperature of 230° F. may be too low to lift the gases out of the stack 162, an induced draft fan 161 or a heat exchanger 163 can be used to reheat the gases to provide sufficient buoyancy to exhaust them to the atmosphere.

Post-Combustion Mercury Control

Any mercury or other volatile trace metals that are not removed by kinetic vitrification in the combustor or by condensation and attachment to the ash cake lining the outside of the fabric filter 16, are removed by injection of an aqueous mixture containing activated carbon, as per the method used to remove the dioxins and furnace with injectors 19. The same injectors are used to simultaneously remove the mercury and the dioxins and furans.

In conclusion, the Group 1 and Group 2 processes and methods, each of which contributes to partial reduction of one or more pollutants emitted by combustion of fossil fuels, will in the aggregate remove essentially all pollutants in a simple to implement set of procedures and at a much lower cost than processes that remove individual pollutants, such as selective catalytic reduction for $NO_x$, and stack scrubbers for $SO_2$. Of even greater importance in practicing this invention is the upstream removal in the furnace or boiler of the major pollutants, such as sulfur dioxide, that form liquid acids below their dew point. This allows the removal of the very low concentration pollutants, such as mercury, that are at extremely low concentrations in the stack gas stream, with far less activated carbon than prior art.

While the invention has been described in terms of embodiments, those skilled in the art will recognize that the invention can be practiced with modifications and in the spirit and scope of the appended claims.

The invention claimed is:

1. A pollution reduction process, comprising substantially removing in a sequential series of processes, in a gas temperature range from about 3000° F. to about 200° F., a plurality of pollutants including nitrogen oxides, sulfur dioxide, dioxins, furans, volatile trace metals in ash, including at least one of arsenic, lead, and mercury, are removed wherein each of the sequential series of processes removes one or more of the pollutants individually and in combination further reduce the pollutants without impairing wall materials in furnaces and boilers wherein the pollutant reduction processes include two groups, wherein a first of the two groups comprises at least sulfur dioxide and takes place in a primary combustion zone, at about 3,000° F. gas temperatures, where fuel is injected and fired with combustion air, followed by a second of the two groups which take place in a post combustion zone between an exit of the combustion gases from the primary combustion gas zone at about 2,600° F. and a duct immediately upstream of a particle filter or electrostatic precipitator at gas temperatures of about 200° F.

2. A method in accordance with claim 1, wherein the first group process reduces the nitrogen oxides by operating a slagging, air-cooled, cyclone combustor in the primary combustion zone under fuel rich conditions.

3. A method in accordance with claim 1, wherein the first group process reduces sulfur dioxide formed by combustion of the fuel by reaction in a gas phase in a slagging cyclone combustor with co-injected limestone or externally calcined limestone particles in a size range between 10 and 74 microns, with at least two-thirds to three-quarters of the reacted calcium-sulfur particles and un-reacted calcium oxide particles impacting and dissolving in a liquid slag layer lining a combustor wall, whose liquid temperatures are about 2000° F., plus or minus several 100° F.

4. A method in accordance with claim 3, wherein ash content in the fuel is insufficient to achieve a slag flow residence time in the combustor of under 3 minutes, in which case more than 50% by weight of ash in a char or high ash coal washing residue is co-injected with coal and limestone in a quantity sufficient to achieve slag mass flow rates on the combustor wall that result in slag residence times in the combustor of less than about 3 minutes.

5. A method in accordance with claim 1, wherein liquid slag is quenched in a water filled tank as the liquid slag drains from a floor at a downstream end of the slagging cyclone combustor.

6. A method in accordance with claim 3, wherein fine sulfur powder of particle size of approximately less than 75 microns is mixed with sawdust whose function is to act as a carrier of the sulfur with the sulfur-sawdust mixture being injected in ports adjacent to that of a sulfur content coal having less than approximately 1% at a mass flow rate of the sulfur-sawdust mixture substantially equal to a 1% or higher sulfur bearing coal for optimizing a sulfur capture process in a slagging combustor by separating the sulfur capture process from a sulfur retention process in a liquid slag layer on the combustor wall, with optimization being implemented with co-injection of, a rice husk char that has less than 1% sulfur, no volatile matter, and over 50% ash, and less than 50% solid carbon, or a fuel with similar properties, including very high ash, low sulfur, low volatiles matter coal.

7. A method in accordance with claim 1, wherein for a first group process the volatile trace metals in coal or fuel including at least one of arsenic and mercury, is gettered by porous carbon activated char that is injected through ports adjacent to fuel injection ports, with the char being in a particle size range between about 10 and 74 microns, and with the reacted char particles impacted and being removed with the slag drained from the combustor.

8. A method in accordance with claim 1, wherein for a first group process the volatile trace metals in coal or the fuel including at least one of arsenic and mercury is gettered by porous limestone that is injected through ports adjacent to fuel injection ports, with the limestone being in a particle size range between about 10 and 74 microns.

9. A method in accordance with claim 1, wherein for a first group process dioxins/furans are reduced inside a slagging, air-cooled, cyclone combustor by reaction with limestone particles that are injected and removed in the slag by reaction in a gas phase in the slagging, air-cooled cyclone combustor with co-injected limestone or externally calcined limestone particles in a size range between about 10 and 74 microns, with at least two-thirds to three-quarters of reacted calcium-chlorine particles and un-reacted calcium oxide particle impacting and dissolving in a liquid slag layer lining a combustor wall.

10. A method in accordance with claim 9, wherein plastic pellets of approximately 1 millimeter in diameter or less, are injected through ports adjacent to the fuel ports in order to provide a uniformly fed source of chlorine to determine an impact of uniform feeding on dioxin/furan formation and capture in the combustor.

11. A method in accordance with claim 1, wherein for a first group process the dioxins and furans are reduced in mass burn municipal waste incinerators that utilize a traveling grate for combustion, in which gas burners, using either natural gas or pyrolysis gas derived from municipal waste, are used to achieve a uniform temperature in a visible flame region of the furnace by means of individual gas burners that are fired, as required, to assure a uniform visible flame or a uniform flame as determined from thermocouple measurements, with the uniform flame being in a gas temperature range of about 1700° F. to 2200° F. into which aqueous droplets of varying size from about 100 to 1000 microns and containing dispersed limestone or lime in a range of about 10 to 74 micron are injected in a flat fan spray perpendicular to an upward gas flow direction with a predetermined number of injectors sufficient to intercept an entire upward gas flow, and with a limestone or lime mass flow rate to neutralize the sulfur dioxide and chlorine gas compounds to prevent acid formation in cooler exhaust ducts, and at mass flow rates to reduce a concentration of the dioxins and furans formed in the high temperature gas.

12. A method in accordance with claim 11, wherein all the injectors utilize a same flat fan spray or conical spray design, differing only in construction material in order to have them compatible with the temperature range of insertion for a gas stream being treated.

13. A method in accordance with claim 1, wherein the nitrogen oxides are reduced in one of the second group processes including introducing additional fuel, including one of pulverized coal, oil and gas, in a quantity to convert fuel lean combustion gases leaving a primary combustion zone to between about 90% to 99% of unity stoichiometry, with final combustion air introduced downstream of a fuel rich zone to reconvert the combustion gases to at least 110% excess air stoichiometry, and with the gas temperature in the fuel rich zone in a temperature range from about 1700° F. to 2600° F.

14. A method in accordance with claim 13, wherein the nitrogen oxides are eliminated in a fuel rich post combustion zone downstream of the primary combustion zone by injecting into the fuel rich zone a flat spray of aqueous droplets perpendicular to a gas flow direction, or in parallel and opposed to the gas flow direction, with the aqueous droplets containing dissolved urea or ammonia in concentration equal to at least a mol ratio of unity to the nitrogen oxides, and with the aqueous droplets having a size distribution ranging from about 10 microns to 1000 microns.

15. A method in accordance with claim 14, further comprising injecting an aqueous solution of urea or ammonia to reduce the nitrogen oxides, which also contains dispersed lime or limestone particles of mean size of 10 micron in concentration of less than 25% by mass of water and a mass flow rate sufficient to achieve a mol ratio of up to 3 to the sulfur dioxide concentration and a mol ratio in excess of unity to a chlorine concentration in the combustion gases.

16. A method in accordance with claim 1, further comprising injecting an aqueous solution of urea or ammonia to reduce the nitrogen oxides, the aqueous solution also contains dispersed lime or limestone particles of mean size of 10 micron in concentration of less than 25% by mass of the water and a mass flow rate sufficient to achieve a mol ratio of up to 3 to the sulfur dioxide concentration as well as a mol ratio in excess of unity to chlorine concentration in the combustion gases.

17. A method in accordance with claim 1, wherein the second group process is implemented in exhaust ducts of the furnace or boiler to remove any residual dioxins and furans by injection of water droplets of varying size between about 10 microns and 1000 microns into a gas stream downstream of economizers or heat changers at initial temperatures between about 350° F. and 700° F. in sufficient mass flow rates to cool the gases to about 250° F., with injectors producing either a flat spray perpendicular to the gas flow direction or a conical spray co-axial and opposed to the gas flow direction.

18. A method in accordance with claim 1, wherein for one of the group two process the lime particles are mixed with and dispersed in the aqueous solution prior to injection into the duct for neutralizing any residual acid compounds of sulfur, chlorine or nitrogen, if analysis of gas samples taken upstream of the injection in a gas temperature range of about 350° F. to 700° F. show a presence of the gas species.

19. A method in accordance with claim 1, wherein one of the second group process is implemented to remove any residual dioxins, furans, and mercury remaining in a gas stream by injection of aqueous droplets of varying size between about 10 microns and 1000 microns that contain dispersed activated carbon particles and at least one of a surfactant and stabilizer, if needed, to prevent agglomeration of the activated carbon particles, and the aqueous droplets being injected either in a flat fan spray pattern perpendicular to the gas stream, or in a conical spray patterns coaxial with the gas stream and facing in an upstream direction.

20. A method in accordance with claim 1, wherein any solid particles remaining in the gas stream downstream of the second group process are removed either by a fabric filter or electrostatic precipitator.

21. A method in accordance with claim 20, wherein an induced draft fan is used to provide sufficient draft to force the gas stream out of a stack of the boiler or furnace into atmosphere.

22. A method in accordance with claim 20, wherein a heat exchanger is used to reheat the combustion gas in order provide sufficient buoyancy to force the gas stream out of the boiler or furnace stack into atmosphere.

23. A method in accordance with claim 1, wherein the first group process includes kinetic vitrification which includes a series of non-equilibrium processes that occur within the primary combustion zone into which pulverized coal is co-fired with solid particle reagents that capture part of gaseous sulfur compounds and vaporized trace metals.

24. A method in accordance with claim 23, wherein reacted particles and solid and liquefied ash particles in coal that contain trapped trace metals impact, melt in a liquid slag layer that lines an air-cooled combustor wall.

25. A method in accordance with claim 24, further comprising air-cooling the combustor wall to allow rapid drainage of the liquid slag layer into a water filled quench tank, before the reacted sulfur and trapped trace metals can re-evolve into the gas stream, wherein the quenched slag is chemically inert.

26. A method according to claim 25, further comprising simultaneously partially reducing the nitrogen oxides by operating the combustor in a staged combustion mode in which fuel rich conditions are maintained in the combustor and additional air is introduced in a post-combustion zone for final burnup of residual gaseous fuel.

27. A method according to claim 1, wherein the second group is implemented in a high temperature post-combustion zone of 1700° F. to 2600° F., wherein remaining sulfur and nitrogen oxides and chlorine are removed from the gas stream by reagent injection using an injector and by re-burning the combustion gases.

28. A method in accordance with claim 27, further comprising water spray cooling of combustion gases in the initial gas temperature range between about 350° F. and 700° F., using flat fan spray or conical injectors, into exhaust ducting to reduce concentrations of the dioxins and furans, and water spray injection of activated carbon particles further downstream in the exhaust ducting to cool the gas to about 250° F. while dispersing activated carbon particles in order to remove any remaining mercury and dioxins and furans.

29. A pollution reduction process, comprising:
a first group of processes taking place in a primary combustion zone at about 3000° F. gas temperatures where fuel, coal or other solid fuels are injected and fired with combustion air; and
a second group of process taking place in a post combustion zone between an exit of combustion gases from the primary combustion zone at about 2600° F. gas temperatures and a duct upstream of a particle filter at about 200° F.,
wherein the first and second group processes, in combination, are provided in sequential order and substantially reduce a plurality of pollutants including nitrogen oxides, sulfur dioxides, dioxins, furans, volatile trace metals in ash, including at least one of arsenic, lead, and mercury.

30. A method according to claim 29, wherein the first group of processes include: staged combustion, in which a stoichiometry in the combustion chamber is fuel rich, followed by excess air combustion at a combustor outlet to reduce the nitrogen oxides; injection of lime or limestone particles in dry powder or liquid slurry form near coal injection ports to reduce the sulfur dioxides, wherein the lime or limestone particles are calcined by combustion gas to calcium oxide that reacts with gaseous sulfur molecules to form a solid calcium-sulfur particles; kinetic vitrification of the volatile trace metals; and ash vitrification such that produced slag is quenched in a water-filled tank and converted into a chemically inert, vitrified slag.

31. A method in accordance with claim 30, wherein the solid calcium-sulfur particles and solid and liquid droplets of ash that are released during coal combustion and that are greater than about 10 microns in diameter impact and dissolve in the slag that lines an inner wall of a slagging combustor.

32. A method in accordance with claim 31, further comprising air-cooling to control a slag layer temperature and viscosity so that the slag is drained into the water filled quench tank to prevent re-evolution of sulfur and trace metals, including at least one of arsenic, lead and mercury, trapped in the slag, wherein the slag layer flow rate is further controlled by the lime or limestone particles injected at rates beyond requirements for sulfur control, the lime or limestone particles further reducing high temperature formation of the dioxins and furans that result from reactions with chlorine in the fuel.

33. A method in accordance with claim 29, wherein the second group process includes:
reburning in post-combustion gases between 1700° F. and 2600° F. to convert fuel lean combustion gases to a fuel rich condition, which reduces the nitrogen oxides;
injecting in said 1700° F. to 2600° F. gas temperature zone aqueous droplets containing urea or ammonia and lime or limestone particles dispersed in the droplets taking place in one of a post-combustion fuel rich zone and fuel rich gases exiting from a primary combustion zone to reduce nitrogen oxides, sulfur dioxides and chlorine and chlorine compounds;
one of (i) injecting air downstream of a reagent injection zone or downstream of the reburn zone to complete combustion of the fuel rich gases and (ii) mixing treated fuel rich gas with untreated combustion gases that have excess air and to complete the unburned fuel combustion;

to remove substantially the sulfur dioxide and chlorine and nitrogen dioxide that remained in the gases exiting the primary combustion chamber;

cooling to a gas temperatures in a range of 700° F. to 350° F. to remove remaining dioxins and furans; and further cooling to a gas temperature range of about 250° F. to remove the remaining mercury and dioxins and furans with activated carbon injection.

\* \* \* \* \*